(12) United States Patent
Eyal et al.

(10) Patent No.: US 7,010,537 B2
(45) Date of Patent: Mar. 7, 2006

(54) METHOD AND SYSTEM FOR VISUAL NETWORK SEARCHING

(75) Inventors: Aviv Eyal, San Francisco, CA (US); Shirley Shor, San Francisco, CA (US)

(73) Assignee: Friskit, Inc., San Francisco, CA (US)

( * ) Notice: Subject to any disclaimer, the term of this patent is extended or adjusted under 35 U.S.C. 154(b) by 818 days.

(21) Appl. No.: 09/843,286

(22) Filed: Apr. 25, 2001

(65) Prior Publication Data

US 2002/0023084 A1 Feb. 21, 2002

Related U.S. Application Data

(60) Provisional application No. 60/200,716, filed on Apr. 27, 2000.

(51) Int. Cl.
*G06F 17/18* (2006.01)

(52) U.S. Cl. .......................................... 707/100; 707/3
(58) Field of Classification Search ................ 707/100, 707/3, 4, 10, 5, 7; 715/513; 704/251; 725/746
See application file for complete search history.

(56) References Cited

U.S. PATENT DOCUMENTS

| | | | |
|---|---|---|---|
| 4,788,675 | A | 11/1988 | Jones et al. |
| 4,870,579 | A | 9/1989 | Hey |
| 4,996,642 | A | 2/1991 | Hey |
| 5,191,573 | A | 3/1993 | Hair |
| 5,297,042 | A | 3/1994 | Morita |
| 5,442,390 | A | 8/1995 | Hooper et al. |
| 5,548,724 | A | 8/1996 | Akizawa et al. |
| 5,583,763 | A | 12/1996 | Atcheson et al. |

(Continued)

FOREIGN PATENT DOCUMENTS

| | | |
|---|---|---|
| EP | 0649121 A3 | 4/1995 |
| EP | 0649121 A2 | 4/1995 |

OTHER PUBLICATIONS

Hollingworth, William, "MiniDisc Manager Read Me" Apr. 2001.
"MP3.com Launches First Fully Interactive Radio Stations," Dec. 1999.
"Firefly: From the Media Lab to Microsoft," Scott Kirsner, Apr. 9, 1998.
"MP3.com and RealNetworks Team Up To Provide New Music Jukebox Users," Sep. 24, 1999.
"New MP3.com Service Lets Consumers Listen To Their Music Anywhere, Anytime," MP3.com Press Release, Jan. 12, 2000. (http://www.creativepro.com/story/news/3622.html).
"MP3.com Announces Strategic Relationship With PortalPlayer, Inc.," MP3.com Press Release, Jan. 6, 2000.
"MP3.com and Listen.com Form Strategic Alliance," MP3.com Press Release, Oct. 28, 1999 (http://www.rhapsody.com/).
"MP3.com and I–Drive.com Join Forces to Store and Manage MP3 Files," MP3.com Press Release, Oct. 6, 1999 (http://www.creative.com/story/news/3619.html).

(Continued)

*Primary Examiner*—Sanjiv Shah
(74) *Attorney, Agent, or Firm*—Van Mahamedi; Shemwell Mahamedi LLP

(57) ABSTRACT

An embodiment provides for conducting searches on a network. A search request is signaled over the network to a search engine. A search result is received that identifies a plurality of network addresses. Multiple pages are automatically rendered, each page being located by a corresponding network addresses in the search result.

44 Claims, 8 Drawing Sheets

U.S. PATENT DOCUMENTS

| | | | |
|---|---|---|---|
| 5,583,868 A | 12/1996 | Rashid et al. | |
| 6,101,510 A | 1/1997 | Stone | |
| 6,363,434 B1 | 3/1997 | Eytchison | |
| 6,112,239 A | 6/1997 | Kenner | |
| 6,353,929 B1 | 6/1997 | Houston | |
| 5,659,732 A | 8/1997 | Kirsch | |
| 5,668,948 A | 9/1997 | Belknap et al. | |
| 5,675,734 A | 10/1997 | Hair | |
| 5,734,719 A | 3/1998 | Tsevdos et al. | |
| 5,778,367 A | 7/1998 | Wesinger, Jr. et al. | |
| 5,790,423 A | 8/1998 | Lau et al. | |
| 5,793,980 A | 8/1998 | Glaser et al. | |
| 6,418,421 B1 | 12/1998 | Hurtado | |
| 5,864,863 A | 1/1999 | Burrows | |
| 5,873,080 A | 2/1999 | Coden et al. | |
| 5,884,282 A | 3/1999 | Robinson | |
| 5,892,905 A | 4/1999 | Brandt et al. | |
| 5,911,043 A | 6/1999 | Duffy et al. | |
| 5,911,139 A | 6/1999 | Jain et al. | |
| 5,915,094 A | 6/1999 | Kouloheris et al. | |
| 6,092,204 A | 6/1999 | Baker | |
| 5,920,856 A | 7/1999 | Syeda-Mahmood | |
| 5,961,603 A | 10/1999 | Kunkel et al. | |
| 5,963,916 A | 10/1999 | Kaplan | |
| 5,966,440 A | 10/1999 | Hair | |
| 5,983,176 A | 11/1999 | Hoffert | |
| 5,987,454 A | 11/1999 | Hobbs | |
| 5,991,374 A | 11/1999 | Hazenfield | |
| 5,996,015 A | 11/1999 | Day et al. | |
| 6,009,459 A | 12/1999 | Belfiore et al. | |
| 6,011,537 A | 1/2000 | Slotznick | |
| 6,016,504 A | 1/2000 | Arnold et al. | |
| 6,021,409 A | 2/2000 | Burrows | |
| 6,026,439 A | 2/2000 | Chowdhury et al. | |
| 6,035,055 A | 3/2000 | Wang et al. | |
| 6,041,318 A | 3/2000 | Danford-Klein | |
| 6,041,360 A | 3/2000 | Himmel et al. | |
| 6,049,829 A | 4/2000 | Li | |
| 6,434,550 B1 | 4/2000 | Warner | |
| 6,058,423 A | 5/2000 | Factor | |
| 6,519,648 B1 | 5/2000 | Eyal | |
| 6,134,596 A | 10/2000 | Bolosky et al. | |
| 6,134,680 A | 10/2000 | Yeomans | |
| 6,151,624 A | 11/2000 | Teare et al. | |
| 6,192,340 B1 | 2/2001 | Abecassis | |
| 6,202,061 B1 | 3/2001 | Khosla et al. | |
| 6,240,423 B1 | 5/2001 | Hirata | |
| 6,246,672 B1 | 6/2001 | Lumelsky | |
| 6,247,069 B1 | 6/2001 | Smyers | |
| 6,317,740 B1 | 11/2001 | Mukherjea et al. | |
| 6,321,226 B1 * | 11/2001 | Garber et al. | 707/10 |
| 6,374,404 B1 * | 4/2002 | Brotz et al. | 725/46 |
| 6,389,467 B1 | 5/2002 | Eyal | |
| 6,408,270 B1 * | 6/2002 | Garber | 704/251 |
| 6,452,609 B1 | 9/2002 | Katinsky et al. | |
| 6,460,060 B1 * | 10/2002 | Maddalozzo et al. | 715/513 |
| 6,463,432 B1 * | 10/2002 | Murakawa | 707/5 |
| 6,484,199 B1 | 11/2002 | Eyal | |
| 6,502,194 B1 | 12/2002 | Berman et al. | |
| 6,526,411 B1 | 2/2003 | Ward | |
| 6,601,066 B1 * | 7/2003 | Davis-Hall | 707/5 |
| 6,633,874 B1 * | 10/2003 | Nusbickel | 707/10 |

OTHER PUBLICATIONS

"MP3.com and MusicMatch Offer Exclusive Download of Custom MusicMatch Jukebox," MP3.com Press Release, Sep. 29, 1999 (http://www.creativepro.com/story/news/3618:html).

"MP3.com, Inc. and PlayMedia Systems, Inc. Agree to Dismiss Lawsuit," MP3.com Press Release, Sep. 29, 1999, Jun. 3, 1999.

"MP3 Goes Mainstream, but Internet Music Has Yet To Find Its Perfect Form," Laura Goldstein, Dec. 1999.

"Top Ten MP3 Utilities," Max Green, FileWorld, Jun. 1, 1999.

"RealNetworks Launches Enhanced RealGuide Connecting Consumers To The Richest Streaming Media Content Available On The Web," RealNetworks Company Press Relaese, Mar. 17, 1999.

"Streaming Media Comes Of Age," Jesse Berst, ZDNet AnchorDesk, Mar. 1999.

"RealNetworks Launches RealJukebox, Turning Internet PC's Into The Best Way To Experiences Music," RealNetworks Company Press Release, May 3, 1999.

"Shareware Music Machine News," May 4, 1999.

"Realnetworks Introduces RealJukebox Plus, The First Complete Digital Music System With CD–Quality Recording And Playback," RealNetworks Company Press Release, Aug. 9, 1999.

"RealNetworks Ships Gold Release Of RealJukebox And RealJukebox Plus, First Complete Digital Music Solution," RealNetworks Company Press Release, May 3, 1999.

"CNET Online To Feature Microsoft Streaming Media Technology, " CNETNetworks Press Releases, Jul. 7, 1998.

"Sonic Foundry and Microsoft Provide First Music Jukebox Based Soley On Windows Media Audio," Microsoft Presspass, Aug. 17, 1999 http://www.microsoft.com/presspass/press/Aug.99/SonicFMSpr.asp.

"Audio/Video Development Tools Servers–Windows Media Player, " ServerWatch, Apr. 14, 1999 http://www.searchwatch.com/stypes/servers/article.php/16277_1298261.

Newsgroup Message Board, alt.music.ween, Subject: Re:Playlists in Windows Media Player, Nov. 17, 1999.

"RealPlayer vs. Windows Media: A Streaming Shootout," Cameron Crouch, Jan. 28, 2000.

"America Online Acquires Leading Internet Music Brands—Spinner.com, Winamp and SHOUTcast, " Jun. 1, 1999 http://classic.winamp.com/community/press/060199.jhtml.

"15 Million Winamp Users Gain Access To Mjuice.com Artists and Labels," August 30, 1999 http://classic.winamp.com/community/press/083099.jhtml.

"Winamp Unveils All New Winamp.com Web site," Dec. 21, 1999 http://classic.winamp.com/community/press/122199.jhtml.

Newsgroup Message Board, alt.music.MP3, Subject: Making a Playlist??, Dec. 28, 1999.

"Digital Audio Software: Winamp 2.50e," The Computer Shopper, Mar. 29, 2000.

MusicMatch JukeBox 6.0, Description History Review, "MusicMatch Jukebox 3.1 reviewed, " Mitch Bechtel, Apr. 22, 1999.

"MusicMatch Unveils Free MusicMatch Jukebox 4.0–Most Powerful MP3 Software Available on the Internet," MusicMatch Press Release, Jun. 10, 1999.

"MusicMatch Jukebox First Digital Audio Software To Easily Integrate playback Of Locally Stored And Streamed Mp3 Music Plus Windows Media Audio Recording," MusicMatch Press Release, Aug. 12, 1999.

"MusicMatch Jukebox First To Integrate Windows Media Video Into Jukebox, Delivers Most Complete Windows Media Experience," MusicMatch Press Release, Nov. 29, 1999.

"MusicMatch taps Microsoft to challenge RealNetworks," Courtney Macavinta, Nov. 30, 1999.

"MusicMatch First Jukebox Software to Integrate Internet Radio Tuner, Offering the Most Powerful Music Playback and Streaming Capabilities Availabe," MusicMatch press release, Jan. 24, 2000.

"MusicMatch Debuts Artist on Demand," MusicMatch press release, Dec. 11, 2002.

"MP3 in Ways You've Never Heard Before, " MP3.com, Michael Robertson, May 19 1999.

"MP3.com's New Features Get Mixed Reception, " CNET News.com, Jim Hu, Jan. 12, 2000.

"MP3.com Fights Fire with Fire, " Wired News, Chris Oakes, Jan. 27, 2000.

"MP3.com Lets Streams Flow, " Wired News, Brad King, Dec. 5, 2000.

"MP3.com Lets You Listen to Music You Already Own, " The Industry Standard, Jan. 13, 2000.

"Downloading a Plethora of Music from the Web is Easier Than Ever," The Argonaut at University of Idaho, Jan. 17, 2000.

"Access Your Music Collection on the Net," Times Computing Online, Sandeep Ajgaonkar, Feb. 2, 2000.

"How to —MP3," Times Computing Online, Sandeep Ajgaonkar, Jun. 30, 1999.

"The Site Formerly Known as TheDJ.com," CNET News.com, Beth Lipton Krigel, Jul. 14, 1998.

"TheDJ.com Morphs Into Spinner.com," The Write News, Jul. 15, 1998.

"Net Radio Gets Down to Business," The Industry Standard, Lessley Anderson, Jul. 27, 1998.

"Net Radio Firm Spinner.com Adds Downloads," CNET News.com, Courtney Macavinta, Dec. 1, 1999.

"Lycos Music Launches as the Ultimate Online Music Destination for Both Listeners," Lycos press release, Nov. 15, 1999.

"99 Rewind: MP3.com Adds Features," MP3.com editorial, Dec. 28 1999.

"99 Rewind: MP3.com Adds Features,"MP3.com, Michael Robertsons, May 19, 1999.

"Lycos and Fast Search & Transfer Introduce Free Web Music Hosting Service, The Listening Room," Fastsearch.com, Nov. 15, 1999.

"Lycos Launch the Listening Room" Shareware Music Machine News, Nov. 17, 1999.

"Lycos Music Launches as the Ultimate Online Music Destination," ProRec.com, Nov. 15, 1999.

"J. River Inserts CD's in Jukebox," J. River press release, Sep. 17, 1999.

"J. River's Media Jukebox Adds Video to MP3," J. River press release, Dec. 2, 1999.

"Music Exchange Release Media Jukebox," Shareware Music Machine News, Dec. 7, 1999.

"Listen.com Launches the internet's First Comprehensive Music Download Directory," Listen.com press release, Jun. 20, 1999.

"Launch Offers Music Player," The Industry Standard, Reuters, Feb. 11, 2003.

"Start–up Myplay tunes in to Music Downloads," CNET News.com, Jennifer Balderama and Jeff Pelline, oct. 13, 1999.

"Myplay makes the Holidays Sing with a Donation of City of Hope Every Time you Share Music," Myplay press relaese, Dec. 15, 1999.

"Bands and Fans Rub Elbows on Riffage.com," CNN.com, Christian McIntosh, Jun. 19, 1999.

"News Web Radio Technology Aims for Masses," CNET News.com, Jim Hu, Dec. 31, 1998.

"Promising to Reinvent Radio, Kerbango Makes it Easy to Find and listen to the Vast Amount of Audio on the Web — Without a PC," Kerbango press release on New Radio Star News, Feb. 7, 2000.

"New Audio/Video Search Service launches," Tech Web News, Malcolm Maclachlan, Jun. 30, 1999.

"Q&A with Robert Shambro, CEO, President and Founder of StreamSearch.com, Inc.," Streamingmedia.com, Jose Alvear, Sep. 7, 1999.

"Searching the Stream," Streaming Media World, John Townley, Feb. 10, 2000.

"Virage Introduces Free MyLogger Video Publishing Application at Streaming Media West '99 Conference," Virage Inc. press release, Dec. 7, 1999.

"Virage and Realnetworks to Bring Virage Technology to Realplayer and Real.com Networks Users," Virage Inc. press release, Apr. 10, 2000.

"Voquette Puts the Web on Cassette," MP3.com, Glenn Grant, Dec. 8, 1999.

"ReQuest Multimedia Selects Quantum Corporation to Provide Audio Storage Technology for New MP3 Home Stereo Jukebox," ReQuest Multimedia press release, Dec. 20, 1999.

"THE VCR, Version 2.0," Red Herring, Rafe Needleman, Apr. 1999.

"Top 10 MP3 Utilities," CNN.com, Max Green, Jun. 7, 1999.

"Top 10 MP3 Players and Applications," CNN.com Max Green, Nov. 26, 1999.

"MusicMatch Jukebox Offers Fraunhofer MP3," Internetnews.com, Oct. 20, 1999.

"Spinner.com Launches Spinner Plus 1.5 ", Jan. 8, 1999.

"America Online Inc.'s Spinner.com Unveils All New Spinner.com 3.0", Oct. 6, 1999.

"Spinner.com Signs Landmark Deal To Drive millions Of Downloads", Apr. 27, 1999.

Google search results for term : music "search agent"; results printed out on May 3, 2004.

Google search results for team : AudioGalaxy ; results printed out on May 3, 2004.

Press Release Entillted; "Audio Highway Signs Agreement to Provide News and Information Programming from The Associated Press for its Listen Up Player" from AP information Services dated Aug. 18, 1997.

"TMF Interview with Audiohighway.com President & CEO Nathan Schulhof" from The Motley Fool.com dated Dec. 13, 1999.

"Audiohighway.com signs co–branding agreement with Weather Underground to Add Audio to Popular Weather Site" from www.wunderground.com dated Mar. 9, 1999.

"Audiohighway.com enters alliance with Warner" by Jayson Matthews dated Jul. 7, 2000.

Website material from mp3.com "Discover New Music, Download Songs, Buy CDs" printed on Feb. 20, 2004.

Website material from mp3.com "Getting Started—Playing MP3s" printed on Feb. 20, 2004.
Website materials from mp3.com "FAQs" printed on Feb. 20, 2004.
Website materials from mp3.com "My.MP3.com Tour" printed on Feb. 20, 2004.
Website materials from mp3.com "FAQs" printed on Apr. 1, 2004.
Website materials from mp3.com "Search" printed on Apr. 1, 2004.
Website material from mp3.com "My.MP3.com Tour" printed on Feb. 20, 2004.
Website material from Muscle Fish printed on Feb. 18, 2004.
"SoundFisher to organize audio" by Andrea Dudrow dated 1998.
Proceedings of the 1999 International Computer Music Conference ; article entitled " A Content–Aware Sound Browser" by Douglas Keisiar, Thom Blum, James Wheaton, and Erling Wold.
Website material from Spinner Networks, Inc. printed on May 15, 2004.
Website material from Streambox.com printed Feb. 18, 2004.
Website material from DC Music Net printed Feb. 18, 2004.
Workshop program from 14th International Joint Conference on Artifical Intelligence entitled "Intelligent Multimedia Information Retrieval"dated Aug. 19, 1995; "Audio Database with Content–Based Retrieval" by Thom Blum, Douglas Keislar, James Wheaton, and Erling Wold.
Website material from Informix in Media and Publishing printed on Feb. 20, 2004.
Website material from Voxware printed Feb. 18, 2004.
Website material from Winamp.com printed Feb. 19, 2004.
Website material from Informix.com printed Feb. 20, 2004.
Website material from Apple iTunes printed May 15, 2004.
Website material from Apple —Software printed Feb. 20, 2004.
Website material from Winamp.com printed Feb. 19, 2004.
Website material from Plasmon printed Feb. 19, 2004.
Website material from Avantis printed Feb. 19, 2004.
Website material form MusicMatch printed Feb. 17, 2004.
Website material Epiphany @VCU: Passwords A Guide to Wired Resources Oct. 22, 1999.
Website material from Hoover's online –Sightsound printed Feb. 17, 2004.
Website material from VocalTec printed Feb. 17, 2004.
Website material from Xing Technology Corporation printed Feb. 17, 2004.
Website material from Digitrends.net printed Feb. 17, 2004.
Website material from infosatellite.com printed Feb. 26, 2004.
Website material "Lycos Help & How–To–Be Your Own DJ at Radiomoi" printed Feb. 26, 2004.
Website material "IP Top Awards: Directory" printed Feb. 26, 2004.
Article from Newsbytes PM, ★★★★★Interactive Radio Creates Canadian Waves Jul. 12, 1999.
Article from profitguide.com Gold rush 2.0★by Susanne Baillie, Feb./Mar. 2002.
Article from streamingmedia.com "Point/Counter–Point: The RIAA vs. MP3.com" by M. Robertson et al, Feb. 18, 2000.
Press Release: "RIAA Signs Inaugural Webcasting License Agreement", May 4, 1999.

Press Release: "Musicmusicmusic Inc. 's Retail Listening Systems Continues Cross–Canada Installations" Sep. 20, 2001.
RadioMoi News from Mickey Quenzer dated Oct. 10, 1998.
MusicDish Industry e–Journal, "Hear the choices–Radiomoi.com What is Radiomoi.com" by Russell Kibbee, Sep. 10, 2000.
MusicDish Industry e–Journal, "Hear the choices–Radiomoi.com Travel in a time machine" by Russell Kibbee, Sep. 10, 2000.
Website material from MusicDish Industry e–Journal printed Feb. 26, 2004.
MusicDish Industry e–Journal, "Hear the choices–Radiomol.com Get your music on demand" by Russell Kibbee, Sep. 10, 2000.
MusicDish Industry e–Journal, "Hear the choices–Radiomoi.com Sample your favorite music" by Russell Kibbee, Sep. 10, 2000.
Website material from MusicDish Industry e–Journal printed Feb. 26, 2004.
MusicDish Industry e–Journal, "Hear the choices–Radiomoi.com Checking out other DJs" by Russell Kibbee, Sep. 10, 2000.
MusicDish Industry e–Journal, "Hear the choices–Radiomoi.com Using other RadioMoi features" by Russell Kibbee, Sep. 10, 2000.
Press Release: "OMT Acquires Assets of Former musicmusicmusic inc. " Nov. 19, 2003.
Article entitled "RIAA Strikes 1st Pact for Web Radio License" by Iv Lichtman dated May 15, 1999.
Article entitled "MTVi in Copyright Dispute with Sony, EMI" by Michael Learnmonth dated Feb. 17, 2000.
Article entitled "1st Webcaster inks RIAA pact" dated May 5, 1999.
Article entitled "Interactive Radio Creates Canadian Waves" by Martin Stone dated Jul. 12, 1999.
"The MP3 and Internet Audio Handbook" from teamcombooks.com printed on Apr. 16, 2004.
Article entitled "Deadline looms in Webcast license fee talks" by Beth Lipton Krigel date May 26, 1999.
Article entitled "Cashing in on Net Radio" by Jennifer Sullivan and Christopher Jones date Sep. 14, 1999.
Article entitled "Record Labels, Webcasters in Arbitration" by Steven Vonder Haar date Nov. 26, 1999.
Article entitled "Point/Counter–Point: The RIAA vs. MP3.com " by Micheal Robertson and Wolfgang Spegg date Feb. 18, 2000.
Article entitled "Copyright bill hits Net Broadcast" by Beth Lipton Krigel date Aug. 4, 1998.
Testimony of Seth Greenstein on behalf of the Digital Media Association Before the Subcommittee on Telecommunications, Trade and Consumer Protection Committee on Commerce U.S. House of Representatives ; Hearing on H.R. 2281 Jun. 5, 1998.
MusicMatch Inc. Bob Ohlweiler, Senior VP of Buiness Development Summary of Testimony Nov. 24, 2000.
Website material from RCS Sound Software. . . www.rcsworks.com printed Feb. 18, 2004.
Article from www.rcsworks.com entitled "Do Disk Jockeys Pick their Own Music?" printed Feb. 18, 2004.
Website material from www.rcsworks.com entitled "Selector for Windows" printed Feb. 18, 2004.
Article from Internetnews.com "Wired Planet Launches update" dated Aug. 30, 1999.

Article from PR Newswire Association, Inc. entitled "Revolutionary Music Site Allows Listeners to Easily Create, Share and Broadcast Legitimate Streaming MP3 Music Stations" Aug. 30, 1999.
Website material from The Webby Awards: 2000 Nominees, printed Mar. 3, 2004.
Website material from WiredPlanet.com printed Feb. 25, 2004.
"Imagine Radio Launches" by Dan Krimm dated Mar. 1998.
Website material from radio.yahoo, imagine radio printed Feb. 25, 2004.
"MTV and VH1 Acquire Imagine Radio and Commit $150 Million in Worldwide Promotional Support to New Venture" from Business Wire dated Feb. 23, 1999.
"Viacom's MTV acquires Imagine Radio" San Francisco Business Times, Feb. 23, 1999.
"Internet radio and music pioneers tune up to play duet" San Francisco Business Times Jul. 27, 1998.
"MTV tuning into Net radio?" IDG.net Feb. 8, 1999.
Website material from TuneTo.com printed Mar. 16, 2004.
Article entitled "Net Radio: Waiting for Dream to Come True" by Janelle Brown dated Jan. 19, 1998.
Article entitled "The MP3 wave As million download music off the Net, privacy enforcement flounders" by Doug Bedell/ The Dallas Morning News dated Jul. 27, 1999.
Article from wired.com entitled "Cashing in on Net Radio" by Jennifer Sullivan et al. dated Sep. 14, 1999.
Article entitled "The Jukebox manifesto" by Janelle Brown dated Nov. 13, 2000 (RN0329–330:2).
Article entitled "The Mobile Invasion (of Privacy?)" by Micheal Grebb dated Feb. 26, 2000.
Website material from Radio–Locator.com printed Feb. 20, 2004.
Website material from teamcombrooks.com entitled "Internet Radio" printed Feb. 25, 2004.
"FW: Major RealAudio 2.0 Event on Jan. 4!(fwd)" from InforMNs Banter Archive printed Mar. 23, 2004.
Website material from greatachievements.org "13. Internet" printed Mar. 23, 2004.
Article entitled "Internet radio no longer a novelty" by Rafael M. Espinosa dated May 2, 1999.
Website material from CDnow: Ther Internet's Number One Music Store printed Mar. 23, 2004.
Website material from vTuner printed on Apr. 2, 2004.
Website material from discjockey.com printed on Mar. 23, 2004.
Printout of MIT List of Radio Stations on the Internet printed out Mar. 23, 2004.
Google search results for "napster" from May 12, 1981 to Jan. 1, 2000 printed out on May 3, 2004.
Article from www.wired.com entitled "The Day the Napster Died" by Brad King dated May 15, 2002 printed on Apr. 3, 2004.
Article from www.time.com entitled "Meet the Napster Shawn Fanning was 18 when he wrote the code that changed the world. His fate, and ours, is now in the court's hands" by Karl Taro dated Oct. 2, 2000.
Case Summary: A&M Records, Inc. v. Napster, Inc. United States District Court for the Northern District of California 2000 U.S. Dist. Lexis 6243 May 5, 2000.
Printout from www.napster.com regarding downloading v2.0 software; printed out on Apr. 3, 2004.
Article from www.wired.com entitled "Sad Song for Net Music Start–Ups"; author unknown, dated Aug. 4, 1999.

Article from www.wired.com entitled "One–Stop MP3 Searching"; author unknown, dated Jun. 16, 1999.
"MP3 worry record labels" by Rafael M. Espinosa dated Dec. 20, 1998 from www.newshearld.com.
Company information "About Scour Home", printed on Feb. 17, 2004.
Website material "Welcome to Scour" Feb. 28, 2000.
Website material scour.net "Scour Media Agent" printed Feb. 17, 2004.
Website material from www.barnesandnoble.com listing of various books: "The Official MP3.com Guide to MP3" by Michael Robertson, Ron Simpson, published Sep. 1999, "MP3 and the Digital Music Revolution: Turn Your PC into a CD–Quality Jukebox!" by John Hedtke, published Apr. 1999; "I want My MP3!How to Download, Rip and Play Digital Music" by Bill Mann, published Oct. 1999; "Mp3 and internet Audio Handbook: Your Guide to the Digital Music" by Bruce Fries, Christine Finn, with Martin Fries published date Oct. 1999; Music on the Internet: (and Where to Find It) by Ian Waugh, published Nov. 1998.
Press release regarding Misic Boulevard; "Now Open! Music Boulevard at www.musicblvd.com the Internet's Largest 24–Hour Multimedia Music Store" Contact: Jill Holt/Cassandra Harris Technology Solutions and Leslie Avakian dated Aug. 16, 1995.
Article entitled "Telebase Launches WWW Multimedia Music Service"; author unknown, date Sep. 1996.
Press release : "Now Open! Music Boulevard at www.Musicblvd.com The internet's Largest 24–hour Multimedia Music Store Leading Online Information Service Company Launches Unprecedented Multimedia Music Service Company Launches Unprecedented Multimedia Music service on the World Wide Web" dated Aug. 16, 1995; Contact Sasha Mullins.
Article entitled "Music Boulevard on the Web" dated Aug. 22, 1995.
Article from www.realnetworks.com "Progressive Networks Introduces Version 2.0 of the Real Audio System" dated Oct. 30, 1995.
Article from www.realnetworks.com "Progressive Networks Ships Real Audio System" dated Jul. 25, 1995.
Article from Post–Newsweek Business Information Inc. Newsbytes, "Music Boulevard On The Web" dated Aug. 22, 1995.
Article from Resposive Database Services Inc. Business and Industry, CMP Publications, Interactive Age "RealAudio pumps up beta sites" by John Evan Frook, dated Jun. 19, 1995.
Article from Information Access Company, Morgan–Grampian PLC, Music Week "Everyone else is doing it —so why don't we?" dated May 20, 1995.
Article from Digital Media, vol. 3, No. 8 "MNI rolls out MusicNet: develops navigation systems for new media services" dated Jan. 31, 1994.
Article from Billboard, vol. 105, No. 42, BPI Communications, "MusicNet lets consumers 'fingers do the walking" dated Oct. 16, 1993.
Article from Billboard, vol. 106, No. 30, BPI Communications, "Rolling Stone phone service puts music on the line" dated Jul. 23, 1994.
"A Modest Proposal" by Dan Krimm, Aug. 1997.
Googie Search for "Lycos MP3" Results from May 12, 1984 to Dec. 31, 1999. Printed on May 8, 2004;.

Website material from discjockey.com printed on May 7, 2004.

Website material from Yahoo!Broadcast from Nov. 10, 1999, printed on May 7, 2004.

Website material from Welcome to the CD Jukebox Channel on Yahoo!Broadcast, printed on May 7, 2004.

Google Search for term "gigabeat"; results printed out on May 8, 2004.

Google Search for term "audiofind.com"; results printed out on May 8, 2004.

Google Search for term "audiodreams"; results printed out on May 8, 2004.

Google Search for term "streambox.com"; reusults printed out on May 8, 2004.

"I want my MP3!how to download, rip, & play digital music" by Bill Mann Copyright 2000.

"The official MP3.com guide to MP3" by Michael Robertson and Rom Simpson copyright 1999.

"MP3 and the Digital Music Revolution Turn Your PC into a CD–Quality Digital Jukebox" by John Hedtke copyright 1999.

"Audio on the Web" by Jeff Patterson and Ryan Melcher, copyright 1998.

Article from 2nd Usenix Symposium on Internet Techhnologies and Systems entitled "The Ninja Jukebox" by Ian Goldberg, Steven D Gribble, David Wagner, and Eric A Brewer (The University of California at Berkeley) dated Oct. 11–14, 1999.

Article entitled "The Networked Video Jukebox" by Laurence Crutcher, member, IEEE, and John Grinham from IEEE Transactions on circuits and systems for video technology, vol. 4, No. 2 Apr. 1994.

Article entitled "The Interactive Multimedia Jukebox (IMJ): a new paradigm for the on–demand delivery of audio/video" by Kevin C Almeoth and Mostafa H Ammar from Computer Networks and ISDN Systems The International Journal of Computer and Telecommunications Networking Vol. 30, Proceedings of the Seventh International World Wide Web Conference, Apr. 14–18, 1998.

Article from Database and Expert Systems Applications 8th International Conference, DEXA '97 Toulouse, France, Sep. 1–5, 1997 entitled "Mulitmedia Federated Database on Intranets: Web–Enabling IRO–DB" by George Gardarin.

Article from Proceedings of the 16th International Conference on Distributed Computing Systems dated May 27–30, 1996 entitled "Scaling Heterogenous Database and the Design of Disco" by Anthony Tomasic, Louiqa Raschid and Patrick Valduriez.

Article from Proceedings of SPIE–The International Society for Optical Engineering, Multimedia Storage and Archiving System II Nov. 3–4, 1997; Chairs/Editors: C. C. Jay Kuo, Shih–Fu Chang, Venkat N Gudivada; "An Object–relational Database Infrastrucutre for Interactive multimedia Service" by Michael Junke Hu and Miao Chunyan.

Article from Proceedings of SPIE–The International Soceity for Optical Engineering, Multimedia Computing and Newtorking 1999, Jan. 25–27, 1999; Chairs/Editors: Dilip D Kandlur, Kevin Jaffay and Timothy Roscoe; "Optimized Regional Caching for On–Demand Data Delivery" by Derek L Eager, Michael C Ferris and Mary K Vernon.

Article from Operating Systems Review: A Quarterly Publication of the Special interest Group on Operating Systems, vol. 25, No. 5; Proceedings of the Thirteeth ACM Symposium on Operating Systems Principles, dated Oct. 13–16, 1991; "Designing File Systems for Digital Video and Audio" by P Venkat Rangan and Harrick M Vin.

Article from IEE Journal on Selected Areas in Communications. vol. 14 No. 6 Aug. 1996; "The Use of Multicast Delivery to Provide a Scalable and Interactive Video–on–Demand Service" by Kevin C Almeroth and Mostafa H Ammar.

Article from IEE Journal on Selected Areas In Communications. vol. 14 No. 6 Aug. 1996; "Performance Model of Interactive Video–on–Demand Systems" by Victor O K Li, Wanjiun Liao, and Eric W M Wong.

Article from IEEE Mar. 1987; "Muse: A Multimedia Filing System" by Simon Gibbs, Dennis Tsichritzis, Akis Fitas, Dimitri Konstantas, and Yiannis Yeorgaroudakis.

Article from Proceedings ACM Multimedia 97, Nov. 9–13, 1997; "A Framework for Supporting Previewing and VCR Operations in a Low Bandwidth Environment" by Wallapak, Kien A Hua, and James Z Wang.

Article from Proceeding ACM Multimedia 1998; Sep. 12–16, 1998; "A tool for Content Based Navigation of Music" by Steven Blackburn and David DeRoure.

Article from Multimedia Applications, Services and Technique–ECMAST '1998, May 26–28, 1998; "Musist Broswer and Navigation Concept" by Steano Antoniazzi, Hans Marmolin, Gottfried Schapeler, Bernd Weickert.

Article from Multimedia Applications, Services and Technique–ECMAST '1997, May 21–23, 1997; "The Kydonia Multimedia Information Server " by Christodoulakis S Pappas N., Kyriakaki G., Maragoudakis Y., Mavraganis Y., Tsinaraki C.

Article from Multimedia Systems 1999; "Synchronized delivery and playout of distributed stored multimedia streams" by Ernst Biersack and Werner Geyer.

Article from Multimedia Systems 1999; "An overview of audio information retrieval" by Johnathan Foote.

Article from Multimedia Systems 1998; "Design and evaluation of a multimedia storage server for mixed traffic" by Igor D.D. Curcio, Antonio Puliaffito, Salvatore Riccobene, Lorenzo Vita.

Article from Multimedia Systems 1997; "Design and analysis of a video–on–demand server" by Alok Srivastava, Anup Kumar, Aditi Singru.

Article from PC Magazine, "Use Playlists with Media Player" by Ron Vanover dated Dec. 1, 1999; Article from PC Magazine , "A secure furture for music: Protecting Artists' rights"; author unknown.

Musicmatch press release, "Musicmatch Jukebox First Digital Audio Software to Easily Intergrate Playback of Locally Stored and Steamed MP3 Music, Plus Windows Media udio Recording and Playback World's First Personal Jukebox Makes it Easier Than Ever Before to Combine Download, Recorded and Streamed Digital Audio Into Single Palylists, and Provides Advanced Recording and Playback Using Microsoft's Windows media Audio" dated Aug. 12, 1999.

Article entitled "jukebox 0.5 (stable)" by Roland Steinbach dated Jan. 18, 1999.

Printout from the edj.com ; printed out on May 11, 2004.

Webreference update Newsletter, dated Nov. 15, 1999.

Article from www.webreference.com entitled "A Streaming Media Jukebox–Part II : Netscape" column 52. Created: Nov. 9, 1999; Revised: Nov. 23, 1999.

Article from www.webreference.com entitled "A Streaming Media Jukebox–Part II : Netscape; The Code" column 52. Created: Nov. 9, 1999; Revised: Nov. 23, 1999.

Article from www.webreference.com entitled "A Streaming Media Jukebox–Part II : Netscape; The Jukebox Script" column 52. Created: Nov. 9, 1999; Revised: Nov. 23, 1999.

Article from www.webreference.com entitled "A Streaming Media Jukebox–Part II : Netscape; The Windows Media Player Plugins's Methods" column 52. Created: Nov. 9, 1999; Revised: Nov. 23, 1999.

"Intelligent Media Agents: Key technology for Interactive Television, Multimedia and internet Applications" by Hartmut Wittig; Copyright 1999.

UNIX in a Nutshell–A Desktop Quick Reference for Sytsem V and Solaris 2.0 By: Daniel Gilly and the Staff of O'Reilly & Associates (Copyright 1986, 1992).

PC Magazine–Jukeboxes (RealNetworks'RealJukebox, Onesteps'Jukebox Xtreme, MusicMatch Jukebox 4.0) (Software Review)(Evalution) Sep. 21, 1999, (p. 138).

Googie Search for "Spinner.com" Results from May 12, 1981 to Dec. 31, 1999. Printed on May 17, 2004.

Googie Search for "TuneTo.com" Results from May 12, 1981 to Dec. 31, 1999. Printed on May 17, 2004.

Googie Search for "wiredplanet.com" Results from May 12, 1981 to Jan. 1, 2000. Printed on May 17, 2004.

Googie Search for "iwave vocaltec" Results from May 12, 1981 to Jan. 1, 2000. Printed on May 17, 2004.

"Musical and Extra–Musical Applications of the NeXT Music kit" by David A. Jaffe 1991 NeXT Computer Inc.

Globe Pubisher Itonut, Ltd: "BlackWeb signs Cooperation Agreement with Real Networks; Real Networks will buy 1.3% of Israeli company BackWeb for $15 Million", Jan. 23, 2000.

Boston Globe: "A Whistle–blower Out to Save Cyber Privacy Sleuth Out to Save Cyber Privacy" Jan. 2, 2000.

PR Newswire Associates, Inc.: "Let Your Imagination Soar This Holiday Season with Unique Gift Ideas from Thomson Consumer Electronics" Nov. 23, 1999.

Information Access Company: Ziff–Davis Publishing; Computer Shopper: RealJukebox beta 2; A Real Deal for Music Fans; RealNetworks MP3 Player; Software Review; Evalution Nov. 1, 1999.

Mecklermedia Corporation —"A Cool Digital Music Tool" Sep. 1, 1999.

Information Access Co., a Thompson Corp. Co.: Miller Freeman UK Ltd., Pro Sound News Europe: "RealNetworks growth continues year–on–year" Sep. 1, 1999.

Information Access Co., a Thompson Corp. Co.: Miller Freeman UK Ltd., Pro Sound News Europe: Philips, "More portable MP3 player plans announced" Sep. 1, 1999.

Reed Elsevier Inc., –Daily Variety: "RealNetworks eyes set–tops, vidgames" Jun. 25, 1999.

CMP Media Inc., Electronic Engineering Times: "Products roll even before the SDMI spec has been hammered out— Four vendors turns up vol. in Internet audio" May 10, 1999.

Cable News Networks, CNN Business Day show: "Real Jukebox to Allow PC Users to Download, Play music" Transcript #9905030305V07, May 3, 1999.

The New York Times Co.; "New System for PC music stirs concern over Piracy" May 3, 1999.

Globes Publisher Itonut: "Back Web signs Cooperation Agreement with US Company Real Networks; Real Networks will buy 1.3% of Israeli company Back Web's Shares for $15 million" Jan. 23, 2000.

Information Access Co., a Thomson Corp. Co; Information Today, Inc., Link–up: "Real Jukebox Plus; RealNewtorks'MP3 player; Hardware Review;" Evalution Jan. 1, 2000.

Info World Media Group, Info World Daily News: "RealNetworks to partner with Sun on Internet video/audio" Jan. 27, 1998.

M2 Communications Ltd., M2 Presswire; "Wide–ranging agreement delivers industry–leading RealSystem 5.0 on scalable Sun Solaris platform" Jan. 27, 1998.

News & Record (Greensboro, NC): "Plug–ins make net more enjoyable" Jan. 26, 1998.

Information Access Company, a Thomson Corporation Company: Ziff Davis Publishing Company, Computer Shopper: PC Week "RealSystem 5.0 shows growing pains; RealServer, RealPublisher, RealPlayer Internet streaming– media tool set; Software Review; Evalution" Jan. 12, 1998.

Morning Call form The Morning Call, Inc.: "RealPlayer great new way to turn the radio dial" Jan. 6, 1998.

Infornation Access Company, a Thomson Corporation Company:Ziff Davis Publishing Company, Computer Shopper; Streaming video gets animated; RealNetworks RealPlayer 5.0; Software Review; Evalution Jan. 1998.

Information Access Company, a Thomson Corporation Company: Ziff Davis Publishing Company, Computer Shopper: All the news fit to stream; RealNetworks Daily Briefing free push service; Company Business and Marketing; Brief Article Dec. 1997.

The Seattle Times Co., The Seattle Times: "RealNetworks' software to be on all Gateway PCS" Jul. 19, 1999.

M2 Communications Ltd., M2 Presswire: "Netscape Communicator 4.6 available today for download on Netscape Netcenter" May 19, 1999.

InfoWorld Media Group, InfoWorld: "Review: RealSystem superbly streams" Mar. 15, 1999.

Philips Business Information, Inc., Mini's New, Media Report: "News Digest" Dec. 7, 1998.

M2 Communications Ltd., M2 Presswire: "Qsound labs and Realnetworks integrate leading edge 3D audio tech into next RealPlayer G2" Nov. 24, 1998.

PR Newswire Assocation, Inc., PR Newswire: "New Audio and Video Search from Excite and Digital 3D Audio from Qsound Labs are First Add–In Player Products for RealSystem G2's Open and Extensible Architecture" Nov. 23, 1998.

PR Newswire Association, Inc., PR Newswire: "New Excite Audio/Video Search Available with RealNetworks RealPlayer G2 Gives Consumers Easy Access to Hundreds of thousands of Multimedia Web Pages" Nov. 23, 1998.

The Jerusalem Post: "Technology forces music industry into era of change" Dec. 10, 1999.

Information Access Company, a Thomson Corporation Company: Ziff Davis Publishing Company, Computer Shopper: The Race is on for Streaming–Media leadership: RealNetworks Takes on Microsoft's NewShow streaming–media technology challenges market–leader RealNetworks and its RealPlayer G2 system; Product Information Oct. 1998.

PR Newswire Association, Inc., PR Newswire: "RealPlayer Momentum Continues to Build with 3.5 Million Downloads in the Month of Jul." Aug. 6, 1998.

PR Newswire Association, Inc., PR Newswire: "CNN Interactive, Fox News Online, and Sony Music Among More than 20 Major Media Companies Providing Exclusive SMIL–Based Programming for RealPlayer G2" Jul. 13, 1998.

Billboard Publications, Inc., Billboard: "As Online Streaming Apps Improve, Debate Heats Up" May 30, 1998.

Plain Dealer Publishing Co., Plain Dealer (Cleveland); "Sound Lackluster on SonyJukebox" Nov. 21, 1998.

CBS MarketWatch: "Yule shopping seen at $2.3 billion" Nov. 2, 1998.

Daily News, L.P., Daily News (New York): "Rolling Stone gets real, puts music on Internet" Nov. 2, 1998.

A/S/M Communications, Inc, ADWEEK; "IQ News: Real Noise at WebNoize" Nov. 2, 1998.

Canada News Wire Ltd., Canada News Wire: "RealNetworks launches RealJukebox, Turning Internet PC's Into the Best Way to Experience Music" May 3, 1999.

Internet Doc: "CAKEWALK INTRODUCES PRO AUDIO 8" by Scott, Andrew; www.musiciansonline.com, Aug. 21, 1999.

Internet Doc: Industry News, www.m2w.net/News/980824.html, Aug. 24, 1998.

Internet Doc: RealAudio product –CD Streamer; (general info & commentary); www.jdusers.com/msqdsp.asp?msgid=7101, Aug. 25, 1998.

Daily News, L.P., Daily News (New York), "Answernet" Jan. 17, 1999.

The Chicago Tribune Company, The Chicago Tribune; "At the emergence of convergence; Why wait for a wonder Appliance? Current technology is sharpening computers' capabilities with music CDs cable TV and video" Oct. 19, 1998.

Investor Business Daily, Inc., Investor Business Daily: "Diamond Mines Net Audio Market" Oct. 7, 1998.

Nationwide News Pty Limited, The Australian: "Platypus Makes Multimedia Easer" Sep. 8, 1998.

Newspaper Publishing PLC, The Independent (London): "Bytes" Sep. 7, 1998.

PR Newswire Association, Inc., PR Newswire: "NetRatings lists DiscJockey.com as 4$^{th}$ fastest growing Site: DiscJockey.com Unique Visitors at Home Grew by 198% in Apr. " Jun. 21, 2000.

Business Wire, Inc., Business Wire: TWEC.com is the Exculsive E–commerce Partner for DiskJockey.com Oct. 19, 1999.

Business Wire, Inc., Business Wire: "DiskJockey.com to launch 110 Channels of Music/Interactive Request Programming on Broascast.com" Jun. 23, 1999.

Business Wire Inc., Business Wire: "Digital Bitcasting's streaming MP3/MPEG —Live and Up Close in Vegas" Apr. 15, 1999.

Business Wire, Inc., Business Wire: "Internet Radio Networks Get Into the MP3 Act with Digital Bitcasting's Help" Apr. 15, 1999.

FT Asia Intelligence Wire, PR Newswire Association, Inc., PR Newswire: "DiskJockey.com Sponsors Boxing Match at Casino Ballroom ESPN2 Braodcast will reach 30,000 In New England" Jul. 11, 2000.

Business Wire, Inc., Business Wire: "Net's Only Interactive Jukebox DiscJockey.com employs Real Networks G2 Streaming Media" Aug. 12, 1998.

News & Record (Greensboro, NC): "Relax on Web with Internet Radio; Internet Radio isn't perfect, but where else can you hear Austrian Yodeling?" Jun. 15, 1998.

Business Wire, Inc., Business Wire: "LoveBeat: Cupid's Home on the Net; DiskJockey.com Launches the LoveBeat LIVE Interactive Request & Dedication Channel" Feb. 4, 1999.

PR Newswire Association, Inc., PR Newswire: "Disk Jockey. Com and CDnow Announce Marketing Partnership" Sep. 15, 1998.

PR Newswire Association, Inc., PR Newswire: DiscJockey.com Chooses MediaAmerica as Streaming Media Ad Sales Representative' Jun. 5, 2000.

The Financial Times Limited, Financial Times (London): "Companies & Finance the Americas: Bertelsmann sees Napster's future in other media" Apr. 11, 2001.

The Times Mirror Company; Los Angeles Times: "California; Judge says Napster Shutdown Possible; Court: The Song–Sharing Company is Scolded in a Hearing to Monitor its Compliance with an Anti–Piracy Injunction" Apr. 11, 2001.

Newsday, Inc., Newsday: "Napster has bought Gigabeat, Company is known for software filtering" Apr. 11, 2001.

The Chronicle Publishing Co., The San Francisco Chronicle: "Judge gives Napster 'F' for effort" Apr. 11, 2001.

The Deal L.L.C., Daily Deal (New York): "Napster acquires Gigabeat" Apr. 10, 2001.

Investor's Business Daily, Inc. Investor's Business Daily: "Internet Audio Sick of the Same Old Song? Try These Sites" Apr. 3, 2001.

Post–Newsweek Business Information, Inc., Newsbytes: "Gigabeat Says It's The Future of Music Delivery" Jan. 24, 2001.

Time, Inc., Time Digital: "You 're the One that I Want; Finding the lastest music online has never been easier. Finding music you really like is a bit tougher. So let your Mubu be your guide" Jan. 2001.

News Aktuell –DPA Firmengruppe, OTS Orginaltextservice: "Gigabeat Introduces Next Generation Personalization Technology for Music/Music Technology Platform Enables Personalization Applications for Portals, Software and Subscription Services" Oct. 31, 2000.

PR Newswire Europe Limited, PR Newswire European: "Gigabeat Introduces Next Generation Personalisation Technology for Music" Oct. 31, 2000.

PR Newswire Association, Inc., PR Newswire: "Gigabeat Introduces Next Generation Personalisation Technology for Music" Oct. 11, 2000.

Time, Inc., Time Digital: "Where To Find Legal Music" Oct. 2000.

PR Newswire Association, Inc., PR Newswire: "Gigabeat Releases Product Suite for Visual Navigation of Music and Other Digital Media; Patented Data Visualization Technology Gives partners Ability to Recommend and Package Their Media Content" Sep. 27, 2000.

Business Wire, Inc., Business Wire; "Gigabeat Opens its Gateway to Liquid Audio and Strengthens its Music Offering" Jul. 12, 2000.

Newsweek, Newsweek: "Hitting the Right Notes" Jul. 3, 2000.

FT Asia Intelligence Wire, PR Newswire Association, Inc., PR Newswire: "CDDB Adds Artifical Intelligence to Service" Jun. 14, 2000.

Gale Group, Inc., IAC Newsletter Database: Newsbytes News Network, Newsbytes PM: "Online Gateway Finds Any Web-based Music" Jun. 1, 2000.

Billboard Publications Inc., Billboard: Untitled, List of Websites, definitons and tools for music fans, Nov. 13, 1999.

Time, Inc., Entertainment Weekly: "Beat Bots; it's Digital vs. human deejays on the Web. So far, the hard discs have it" Oct. 15, 1999.

VNU, Computing: "Technique; Internet Radio; Quite Literally Webtastic" Sep. 23, 1999.

Gruner –Jahr USA Publishing, Fast Company: "Listen Up! The Web Makes Noise" Sep. 1999.

Reed Elsevier Inc., Daily Variety: "Sites For Sound" Aug. 30, 1999.

The Chicago Tribune Company, The Chicago Tribune: Chicago Sports Final Edition, KIDSNEWS; p. 5; Zone: C; Playing around. Nothing but Net, Jun. 29, 1999.

Newsday, Inc., Newsday (New York): "Coing Radio Ga Ga/ Use Your PC and the Net to tune in to Talk or Music" Jul. 14, 1999.

The New York Times Co., The New York Times: "Library/ Internet Radio; Listeners Take on Role of the Deejay" Nov. 5, 1998.

Sentinel Communications Co., Orlando Sentinel: "Getting Tuned in to Internet Radio Sites" Sep. 18, 1998.

PR Newswire Association, Inc., PR Newswire: Untitled, Financial News Section, Mar. 11, 1998.

PR Newswire Association, Inc., PR Newswire: "IUMA Partners with Listen.com to Provide Artists with IUMA's Website Creation tools" Jan. 4, 2000.

Editor & Publisher Co., Inc. Editor & Publishers Magazine, "Musical notes from the underground' Garage Bands' Roclin All Over the World" Jan. 3, 2000.

PR Newswire Association, Inc., PR Newswire: "EMusic.com to Acquire Tunes.com, Rolling Stones.com & DownBeatJazz.com; Top Seller of Downloadable Music Expands Reach With One of the Internet's Most–Trafficked Music Networks" Nov. 30, 1999.

PR Newswire Association, Inc., PR Newswire: "IUMA to share advertising Revenue with all IUMA Artist on an on Going Basis; Challenges MP3.com and Other Emerging Artist Web Sites to Match the Offer by Compensating Unsigned Artist Fairly" Nov. 15, 1999.

PR Newswire Association, Inc., PR Newswire: "Reinventing Radio Internet Startup–Kerbango–Debuts at Upside's Launch!; Former Apple, Power Computing and OnRadio Execs Announce New Internet Radio Services and Appilances" Oct. 13, 1999.

Informa Publishing Group Pic., Music & Copyright "Independents and Unsigned Acts Increase Interest Activity while SDMI is Delayed" Oct. 6, 1999.

Billboard Publications, Inc., Billboard: "BMI, EMusic Plan Downloads & Writer Sites" Sep. 25, 1999.

Business Wire, Inc., Business Wire: "BMI, EMusic.com Announces Licensing Agreement and e–Commerce Agreement" Sep. 16, 1999.

Informa Publishing Group Pic., Music & Copyright "The Opportunities and Threats Posed by Digital Distribution for the Record Industry" Feb. 24, 1999.

Informa Publishing Group Pic., Music & Copyright: "Digital Distribution to be the Fastest Growing Sector of US Music Business" Dec. 16, 1998.

Journal Sentinel Inc., Milwaukee Journal Sentinel (Wisconsin): "An Internet Jukebox.Gains in Popularity" Nov. 29, 1998.

The Financial Times Limited, Financial Times (London): "Digital jukebox makes sweet sound of music on the internet: The success of a small US site has a big implications for the mainstream industry" Nov. 19, 1998.

NLP IP Company, Inc., a Subsidiary of American Lawyer Media, Inc., Multimedia & Web Strategist: "Speedbumps on Information Highway; Digital Distribution of Music: How Current trends Affect Industry" Oct. 1998.

Globe Newspaper Company, The Boston Globe: "Wired for Sound; Tired of being programmed by the music machine?The Net sets you free" Aug. 21, 1998.

CMP Information Ltd, Music Business International: "Liquid Audio" Dec. 1997.

Business Wire, Inc., Business Wire: "Knitting Factory to Sell Music Over the Internet Via Liquid Audio's Secure Music Delivery System" Jul. 21, 1997.

Industry Standard Communications, Inc., The Industry Standard: "MP3.com's New Tools Break Rules" Jan. 24, 2000.

Newsweek, Newsweek: "MP3.com's New Tune" Jan. 24, 2000.

Information Access Company, a Thomson Corporation Company; ASAP, San Diego Business Journal, "Sucessful MP3.com Continues Reinventing itself" Jan. 24, 2000.

Time, Inc., Fortune: "How the Internet Hits Big Music" May 10, 1999.

Industry Standard Communications, Inc., The Industry Standard: "A Few Truths About MP3.com" Mar. 22, 1999.

CMP Information Ltd., Studio Sound: "The Musical Internet" Mar.1999.

The Washington Post, The Washington Post: "Big Record Labels Start to Like the Sound of Online Music" Jan. 30, 2000.

BPI Communications, Inc., Billboard: "MP3.com Service Raises Some Industry Eyebrows" Jan. 22, 2000.

Billboard Publications, Inc., Billboard: "Sites + Sounds Spotlight: Where the Downloads Are" Nov. 13, 1999.

John Fairfax Publications Pty Ltd., Business Review Weekly: "On the Web, Music is Better Than Sex" Oct. 29, 1999.

Living Media India Ltd., Computers Today: "Jukebox in the Sky" Sep. 30, 1999.

information Access Company, a Thomason Corporation Company: ASAP, San Diego Business Journal: "MP3 event sings of industry's growth; MP3 Summit" Jun. 21, 1999.

Michigan Daily via U–Wire, University Wire: "is downloadable music the .wav of the future?" Jan. 27, 2000.

Journal Sentinel, Inc., Milwaukee Journal Sentinel: "New Programs simplify MP3 music search" Jan. 25, 2000.

South Bend Tribune Corporation, South Bend Tribune: "Industry fights to stop free copies" Jan. 24, 2000.

The New York Times Company, The New York Times: "MP3 Trading Services Can Clog Networks on College Campuses" Jan. 20, 2000.

OSU Daily Barometer via U–Wire, University Wire: "Oregon State U continues to block MP3 Web site" Jan. 19, 2000.

Toronto Star Newspapers, Ltd., Hamilton Spectator: "Surfing wave of MP3s; Music industry fears losing business but fans, artists enjoy benefits of sampling" Jan. 14, 2000.

Knight Ridder/Tribune News Service, The Philadelphia Inquirer: "CDNow offering wares on Napster" Jan. 12, 2000.

Daily Northwastern via U–wire, University Wire: "Music server banned from Northwestern U. network" Jan. 7, 2000.

The Arizona Republic, The Arizona Republic: "Music For A Song Web Users can Get Free Tunes by giving small bands a hit" Jan. 6, 2000.

Micromedia Limited, Canadian Business and Current Affairs, United Western Communications Ltd., Report Newsmagazine: "The campaign to stop Web Music piracy" Jan. 3, 2000.

Informa Publishing Group Plc., Music and Copyright: "RIAA Sues Napster for $100,000 Per Unauthorised Recording it Distributes" Dec. 15, 1999.

The Providence Journal Company, Providence Journal–Bulletin: "More For your Money–Cybertalk–Music shareware skips over detail of copyright law" Nov. 29, 1999.

Time, Inc., Time Magazine: "The Year in Science and Technology; We learned amazing things about the outer reaches of space and the inner workings of the human body" Winter 2000.

Micromedia Limited, Canadian Business and Current Affairs, CB Media Ltd., Profit: The Magazine for Canadian Entrepreneurs: "Canadians.com: the Internet has long promised vast global opportunities. Finally, Canada's entrepreneurs are taking charge" Sep. 1999.

Sun Media Corporation, London Free Press: "Net Site Aims for Global Database so Far, Internet Service has been making sweet MusicMusicMusic" Jul. 30, 1999.

Informa Publishing Group Pic., Music and Copryright: "RIAA" May 19, 1999.

Toronto Star Newspapers, Ltd., The Toronto Star: "Facing the Music" Jan. 21, 1999.

Information Access Company, a Thomson Corporation Company; ASAP, Plesman Publications Ltd., Computer Dealer News: "Musicmusicmusic holds keys to Web–based selling; Musicmusic Inc.," Dec. 15, 1997.

Post–Newsweek Business Information, Inc., Newsbytes, "Metasearches often are best bet" Jan. 13, 1999.

The Press Enterprise Co., Press Enterprise: "Scouring the Net; Site of the Week" Jan. 4, 1999.

Glasser LegalWorks, Internet Law Researcher: "Around the Legal Web Sites" Dec. 1998.

Tower Media, Inc., The Daily News of Los Angeles: "Download of Controversy; MP–3 Format Makes it Easy to Move Music" Nov. 7, 1998.

Information Access Company, a Thomson Corporation Company; ASAP, Ziff–Davis Publishing Company, PC/Computing: "Find Your Specialty; Directory" Nov. 1998.

Plain Dealer Publishing Co., Plain Dealer: "Music Lover Dances to; Difficult Anti–Piracy Tune" Oct. 24, 1998.

Living Media India Ltd., Computers Today: "Web Sites, News, Net Tools" Oct. 15, 1998.

Daily Bruin via U–Wire University Wire: "Search engine created by Bruins undergoes multimedia Improvements" Oct. 6, 1998.

Times Printing Company, The Chattlanooga Times: "You can leave the world behind on a fall hike" Sep. 24, 1998.

Gannett Company, Inc., USA Today: "Big Bird has some advice for the folks" Sep. 23, 1998.

Newsweek, Newsweek: "A Smart Search Engine" Sep. 14, 1998.

The Austin American–Statesman, Austin American–Stateman (Taxas): "Searching for the right job; Recent grads' search for sucess ends" Sep. 5, 1998.

The Times Mirror Company, Los Angles Times: "The Cutting Edge; New Search Engine Scours Web for Multimedia sites; Internet: UCLA Student Project Quickly Evolves to Establish A High–Traffic Niche" Aug. 31, 1998.

PR Newswire Association, Inc., PR Newswire: "Scour.net web site offers first multimedia search engine and guide; Innovative new Search engine finds multimedia on the Internet; search site feature largest ever image thumbnail index with over one million images" Aug. 18, 1998.

PR Newswire Association, Inc., PR Newswire: "WildTangent Launches Beta of its 3D Audio Driver Plug–In for Sonique and Winamp Players; Free SDK Allows Web Developers to Create Custom Visualizations" Jan. 25, 2000.

Des Monies Register, Des Moines Register: "Free and easy; Using mp3 software, access to thousands of popular songs is available on the without permission from record companies" Dec. 6, 1999.

Financial Times Information, Global News Wire, VNU Business Publications Ltd., Newswire: "Lycos Acquires Gamesville.com for $207 m" Nov. 24, 1999.

Business Wire, Inc., Business Wire: "Lycos Music Launches as the Ultimate Online Music Destination for Both Listeners and Artist; Alliances with Rolling Stone, Billboard, Fast Search and Transfer, and Listen.com" Nov. 15, 1999.

Newsday, Inc., Newsday: "Continuing Ed/Turning your PC into a Digital Jukebox" Oct. 20, 1999.

The Houston Chronicle Publishing Company, The Houston Chronicle: "Software" Oct. 15, 1999.

Information Access Company, a Thomson Corporation Company; ASAP, EMAP Media Ltd., Internet Magazine: "Sonique; Brief Article" Sep. 1, 1999.

Tower Media, Inc., The Daily News of Los Angeles: "Digital L.A.; Lycos gives a boost to Music on the Net" Aug. 14, 1999.

Globe Newspaper Company, The Boston Globe: "Lycos buys into notion MP3 more popular than sex" Aug. 6, 1999.

Business Wire, Inc., Business Wire: "Lycos Acquires Sonique Music Player; Sonique with Millions of Downloads, Provides Users Seamless Access to Static and Streaming Audio Files" Aug. 6, 1999.

The News York Times Company, The New York Times: "Music; The MP3 Revolution: Getting With it" Jul. 18, 1999.

M2 Communications Ltd., M2 Presswire: "Intertrust, InterTrust/Mediascience announce Meta Trust–certified Sonique Media Player" Jun. 16, 1999.

Time, Inc., Entertainment Weekly: "Gimme th@t; the latest and coolest in wired widgetry" Nov. 6, 1998.

Informa Publishing Group Pic., Music and Copyright: "AOL–Time Warner Looks set to speed up digital distribution of Entertainment content" Jan. 19, 2000.

The Austin American–Statesman, Austin American–Statesman: "You've got music!Time Warner, AOL deal could pump up delivery of" Jan. 17, 2000.

Financial Times Information, Global News Wire: "Faetures: Cutting the Chords: MP3 has replaced sex as the biggest thing on the internet. Captain internet provides a concise guide for the perplexed" Nov. 2, 1999.

Financial Times Information, Global News Wire: "Features: Cutting the Chords: MP3 has replaced sex as the biggest thing on the internet. Captain internet provides a concise guide for the perplexed" Nov. 2, 1999.

The Washington Post, The Washington Post: "Deal May Make Online Music Pay" Jan. 12, 2000.

Crain Communications, Inc., Advertising Age, "To witness broadband era's first impact, tune in to radio" Jan. 10, 2000.

Business Wire, Inc., Buisness Wire: "AOL, Inc., Appoints Chris Douridas to Vice Presidents of Music Programming for AOL's Spinner, Winamp and Shoutcast Brands" Dec. 8, 1999.

Business Wire, Inc., Business Wire: "MP33Lit.com Inc. Partners with AOL's Spinner.com to Provide Spoken Word Audio Content for Playlist –To–Go" Dec. 2, 1999.

Time, Inc., Fortune Special: "Tune In; MP3 goes mainstream, but Internet music has yet to find its perfect form" Dec. 1, 1999.

PR Newswire Assication, Inc., PR Newswire: "EMusic.com to Provide Its Quality Catalog Through AOL Spinner.com's New Music Download Service, Playlist–to–go (TM)" Dec. 1, 1999.

Business Wire, Inc., Business Wire: "AOL's Spinner.com to Celebrate 'The Best of Y1k'; Spinner.com Highlights top Songs from the 20th Century In Six Different Categories" Nov. 11, 1999.

PR Newswire Association, Inc., PR Newswire: "Elektra Records, AOL's Spinner.com, Winamp Brands, AOL Music and Mjuice.com Bring 'Anything'to Internet Fans Hungry for Preview of Third Eye Blinds New Album 'Blue '" Nov. 3, 1999.

Plain Dealer Publishing Co., Plain Dealer: "Musicians; Spread Works; On Internet" Oct. 16, 1999.

Time, Inc., Enternment Weekly : "Beat Bots; It's digital vs. human deejays on the Web. So far, the hard disc have it." Oct. 15, 1999.

Business Wire, Inc., Business Wire: "American Online Inc.'s Spinner.com Unveils All New Spinner.com 3.0" Oct. 6, 1999.

Business Wire, Inc., Business Wire: "AOL Inc.'s Spinner.com Announces World Premiere of Spinner.com 3.0" Oct. 6, 1999.

Business Wire, Inc., Business Wire: "AOL Inc.'s Spinner.com Announces World Premiere of Maverick Records'Meshell Ndegeocello's Latest Single, 'Grace'" Aug. 11, 1999.

Times Mirror Company, Los Angeles Times: "The Cutting Edge: Focus on Technology; Cyberspace; Web Surfing For the Next Wave In Radio" Aug. 2, 1999.

Industry Strandard Communications, Inc., The Industry Standard: "Music Biz Plugs In" Jul. 26, 1999.

Business Wire, Inc., Business Wire: "K–tel Online Partners with AOL's Spinner.com to Provide Music Content for Playist–To–Go; Deal Exposes K–tel.com to 1.7 Million Unique Users Per Month" Dec. 1, 1999.

Newsday, Inc., Newsday: "Going Radio GA GA / Use your PC and the Net to Tune in to Talk or Music" Jul. 14, 1999.

Billboard, Publications, Inc., Billboard: "AOL Buys Make it Web Music Force" Jun. 12, 1999.

PR Newswire Association, Inc., PR Newswire: "Musicmaker.com to be Exclusive Provider of Custom CDs for Spinner.com, Leading Internet Music Broadcaster of 1.5 Million Songs per Day to 2.5 Millon Listeners" May 26, 1999.

Billboard, Publications, Inc., Billboard: "Yahoo! Begins Webcasting With 10 Online Channels" May 22, 1999.

The New York Times Company, New York Times: "Trying to Move On–line Radio Beyond a Niche" May 17, 1999.

Business Wire, Inc., Business Wire: "Spinner.com Provides Audio Programming and Technology for Yahoo! Radio; Spinner.com Lends Internet Music Leadership and Expertise to Create Awareness and Usage of its Service" May 11, 1999.

Business Wire, Inc., Business Wire: "Spinner.com Partners with Record Label Phoenix Media for Internet Broadcast of Exclusive Live Recordings by Marquee Artists" May 4, 1999.

Business Wire, Inc., Business Wire: "Spinner.com Signs Landmark Deal to Drive Millions of Downloads of Spinner Plus and Real Networks'RealPlayer G2" Apr. 27, 1999.

Business Wire, Inc., Business Wire: "Spinner.com Announces Strategy to Reach Broadband Consumers; Opens New Markets, Showcase CD–Quality Audio Content" Mar. 9, 1999.

Badger Herald via U–Wire, University Wire: "Spinner.com: Internet killed the radio star" Feb. 10, 1999.

Asia Pulse Pte Limited, ASIA Pulse: "Spinner.com Goes Global with Japan Investment/Partnership" Feb. 8, 1999.

Post–Newsweek Business Information, Inc., Newsbytes: "Spinner.com Gains Support From Intel and Sony" Feb. 1, 1999.

The New York Times Company, The New York Times: "Library/Internet Radio; On Spinner, Wide Range of Choices" Nov. 5, 1998.

M2 Communications Ltd., M2 Presswire: "Sun Microsystems, Spinner.com turns to Sun to transform into online music powerhouse" Oct. 28, 1998.

Chicago Tribune Company, Chicago Tribune: Radio Waves; There's more than music in the air for those who tune in to web broadcast Oct. 8, 1998.

The Guardian Newspapers Limited, The Guardian: Untitled; Regarding Spinner.com, May 31, 1999.

Simba Information Inc., Electronic Advertising & Market Report: "Spinner.com picks up sponsors, Launches Rich Media Format" Oct. 6, 1998.

Tower Media, Inc., The Daily News of Los Angeles: "Digital L.A.; Redefining radio: Stations large and small riding a new wave on the Net" Oct. 3, 1998.

Business Wire, Inc., Business Wire: "Spinner.com puts more than 100 channels of continuous music on listeners'Web pages; Scores rave reviews" Sep. 29, 1998.

Plain Dealer Publishing Co., Plain Dealer (Cleveland): "Spinner Web catches your ear" Sep. 5, 1998.

Business Wire, Inc., Business Wire: "Spinner.com names media and publishing veteran to lead sales and commerce efforts; Publisher of Inc. Magazine joins Internet music innovator as Executive Vice President" Jul. 28, 1998.

The Chronicle Publishing Co., The San Francisco Chronicle: "A new dimension in music videos; MTV gets a run for its money with interactive videos" Jul. 20, 1998.

Business Wire, Inc., Inc., Business Wire: "Internet music pioneer TheDJ.com morphs into Spinner.com" Jul. 15, 1998.

The New York Times Co., The New York Times: "Trying to move online radio beyond a niche" May 17, 1999.

Badger Herald via U–Wire, University Wire: "Spinner.com: Internet killed the radio star" Feb. 10, 1999.

The Chronicle Pubishing Co., The San Francisco Chronicle: "New dimension in music videos" Jul. 20, 1998.

Business Wire, Inc., Business Wire: "Internet music pioneer TheDJ.com morphs into Spinner.com" Jul. 15, 1998.

Business Wire, Inc., Business Wire: "Spin and Vibe magazine exec named to head business development at the TheDJ.com; Fred McIntyre appointed to lead distribution, content and advertising partner efforts" Jun. 23, 1998.

Time Inc., Time Magazine: "Playing to different scores" Jun. 1, 1998.

Business Wire, Inc., Business Wire: "TheDJ.com plays a tribute to Frank Sinatra; Internet music broadcaster launches a "SinatraStyle" Channel" May 16, 1998.

Business Wire, Inc., Business Wire: "TheDJ.com introduces new version of the TheDJ Player; Software for version 3.0 of TheDJ Player available for downloading" Mar. 3, 1998.

M2 Communications Ltd., M2 Presswire: "Realnetworks; Internet music forerunner TheDJ.com teams with RealNetworks" Feb. 5, 1998.

Business Wire, Inc., Business Wire: "The DJ Networks announces TheDJ music partner program for record labels" Feb. 26, 1997.

The Times Mirror Company; Los Angeles Times: "Postcard from Cyberspace; The Cutting Edge; RealAudio gives rise to the online radio programs" Jul. 8, 1996.

M2 Communications Ltd., M2 Presswire: "Terraflex Data Systems; TheDJPlayer –first windows application built on the RealAudio player engine" Jun. 7, 1996.

Business Wire, Inc., Business Wire: "Terraflex lauches TheDJ Website introducing virtual DJ technology, the answer to commercial free radio" Apr. 22, 1996.

Businessweek.com –Internet download: "POINTCAST: The Rise and Fall of an Internet Star" http://www.business.com:/1999/99_17/b3626167.htm?scriptFramed, printed May 20, 2004.

http://www.wired.com/news/download/pointcast.html: Internet research page(s) —"Use the Pointcast Business Network to Get Wired News" printed May 20, 2004.

www.keyscreen.com/Keyscreen(s)4/PCN.htm: Internet research page(s) —Keyscreen.com –Pointcast Network Download and Screenshot (Point Cast Network) printed May 20, 2004.

sfgate.com: Internet research page(s) –"Move Over, Pirate Radio —from a Bernal Heights garage, Internet station SomaFM plays tunes for the whole wide world, and it's all perfectly legal" Jun. 30, 2004.

* cited by examiner

METHOD AND SYSTEM FOR VISUAL NETWORK SEARCHING

RELATED APPLICATIONS

This application claims benefit of priority to U.S. Prov. Patent No. 60/200,716, entitled "Method and System for Visual Network Searching," filed Apr. 27, 2000 and naming A. Eyal and S. Shor as inventors; the aforementioned priority application being hereby incorporated by reference.

BACKGROUND OF THE INVENTION

1. Field of the Invention

This invention relates to the field of searching for digital information on a network. In particular, the invention relates to network searching using visual feedback.

2. Background

Search engines exist on the Internet to locate web sites that match a particular search criteria. Users on terminals may submit search terms and requests in order to receive results that are determined to match the search request. The results are usually provided to the user as a list of links. The user must select each link to view the corresponding page. When one page is opened, the user must select to return to the page having the search result to select another link. Thus, to view each link located by a search result, the user may have to make one or two selections, requiring multiple web pages to be loaded and/or displayed.

SUMMARY OF THE INVENTION

Embodiments of the invention allow users to search for web pages on the Internet, and to view search results in an animated fashion. In an embodiment, a search engine returns a response to a query of a user. Rather than provide the result as a compilation of selectable links, a page for a first link specified in the result is rendered for the user. A page for a next link may automatically be rendered after the page for the first link is displayed, creating a slide show effect. Alternatively, the user may be provided a user-interface for selecting to view a page for another link. The page for the other link is then displayed without requiring the viewer to actually select the link to that page.

DETAILED DESCRIPTION

A. System Overview

Embodiments of the invention display resources of information on network sites that match a search request. The response to the search request is made by way of displaying one or more network sites that match the search request. The network sites can be displayed in a sequential and animated manner, without requiring additional selection or interaction by the end user.

Embodiments of the invention include several advantages over other known systems. In other systems, the search result includes links to network sites, listed in selectable form. The user is then required to select each link manually, and then recall the search results after viewing each link before selecting another link. In contrast, a user under an embodiment of the invention is able to view network sites in the search result, without having to select each link manually. Moreover, the user does not have to recall the search results to select each additional link in the search result, or to browse additional sites.

In an Internet application, an embodiment of the invention displays one or more web pages in response to a search request. The feedback to the user may be in the form of a slide show, where web pages matching the search request are sequentially displayed to the user. The web pages may be displayed automatically. Alternatively, the user may be provided a navigation control on a user-interface to select web pages of other links in the search result.

B. System Diagram

Figure 1:
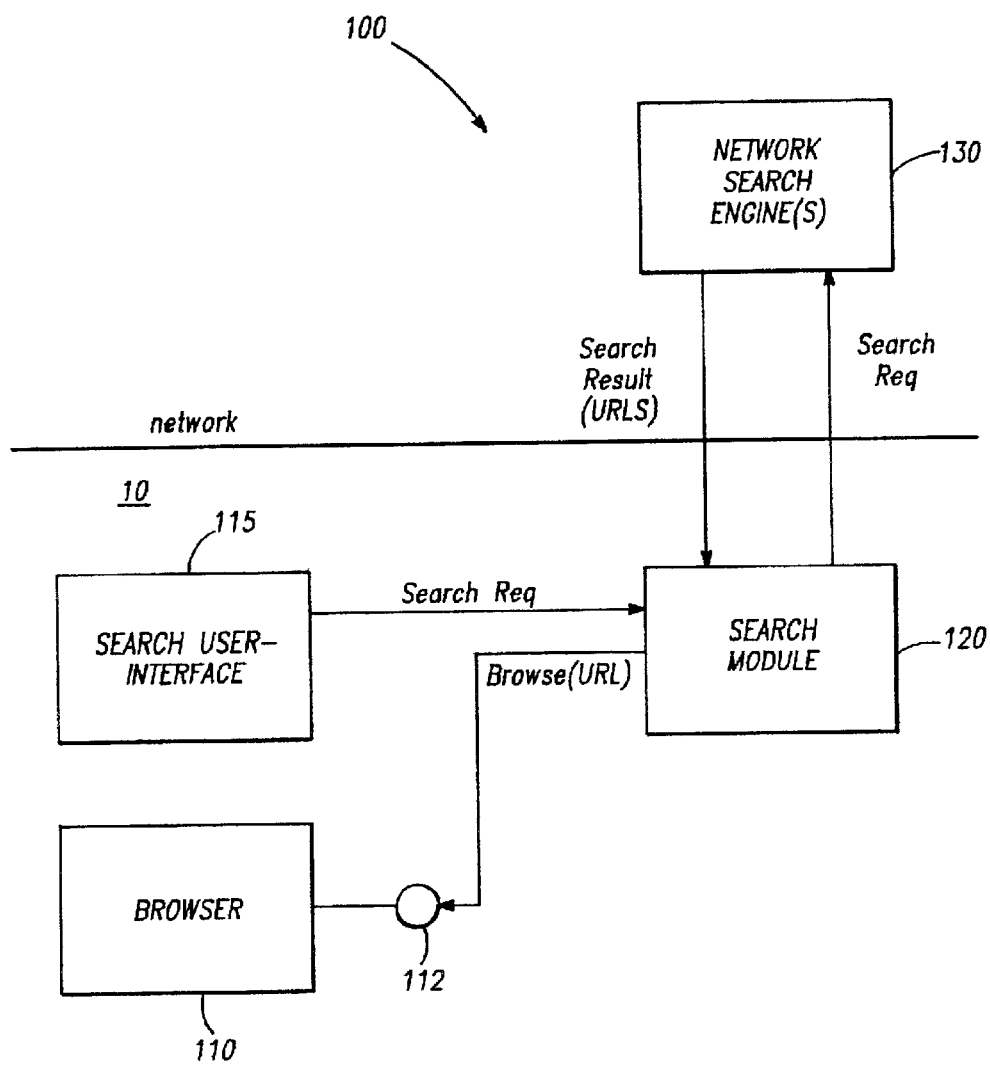
FIG. 1 illustrates a block diagram of a system, under an embodiment of the invention.

FIG. 1 illustrates a block diagram of a system 100 for providing visual network content feedback in response to a search request, under an embodiment of the invention. The visual feedback may be in the form of displaying resources of the multiple network sites comprising the response. For example, the system 100 may automatically display web pages in a sequential manner to Internet sites that are determined to match a criteria set forth in the search request.

In an embodiment, system 100 includes terminal and server side components that combine to provide the visual feedback. On the terminal, system 100 includes a network browser 110 and a search user-interface module 115. The network browser 110 includes an Application Programmable Interface (API) 112 that exposes its functionality. The search engine 120 communicates across a network with one or more network search engine(s) 130.

In an embodiment, the network is the Internet. Other embodiments may be implemented on any network that carries digital information, such as local-area networks (LANs), Wide Area Networks (WAN), Extranets, Intranets, Internet, and wireless networks, or networks utilizing wireless transmissions. An example of a network for use with an embodiment of the invention includes a network operating under a transmission control protocol/Internet protocol (TCP/IP). Embodiments of the invention may also be employed on proprietary WANS, such as America Online™. Thus, discussion of embodiments employed on the Internet are exemplary, and equally applicable to other types of networks described above.

A user on user terminal 10 signals a search request using the search user-interface module 115. The search request is received by search module 120. The search request may be in the form of a text based entry. Alternatively, the search request may include a voice command. The user-interface 115 or search module 120 may interpret the voice command for the network search engine 130.

The search module 120 signals the search request to a network search engine 130. The search engine 130 may be configured for the network being used. In an embodiment, search engine 130 includes Internet web sites such as Yahoo®, Lycos®, and Infoseek®. The search request may be made to more than one network search engines. The system 100 is configurable to identify and retrieve only the best matching URLs in the results returned from each of the network search engines 130. In an embodiment, the system 100 then uses only the best matching URLs to display to the user. In some embodiments, the network search engines include internal search engines located on specific web sites. For example, the network search 30 engine may be located on an e-commerce sites such as Amazon.com™ or Ebay™.

The network search engine 130 returns a result in response to the search request. The result is received by search module 120. Unless no matches are identified, the result includes one or more URLs. Each URL in the result locates a network site having resources that match the search request, according to network search engine 130. As an example, the network resources may correspond to text appearing on the network site, or identifiers used to identify the site with a search engine.

Once network search engine 130 responds, the search module 120 controls the network browser 110 to access and display the site corresponding to each URL in the search result. The search module 120 controls the network browser 110 through commands transmitted to the API 112. In an embodiment, the search module 120 signals each URL with a command to network browser 110 so as to cause the network browser component to output a network resource of each URL in the search result. For example, the search module 120 signals the API 112 to <browse(URL)> for each URL in the search result.

The commands may be sent sequentially to for each URL in the search result. Thus, when the search result contains multiple URLs, the network resources are outputted sequentially by the browser 110. For example, in Internet applications, a web page for each URL in the search result may be displayed in a sequential manner. The display of the web pages may be made to simulate a slide show.

Further, API 112 may be signaled to display web pages on the end terminal in a full-screen mode. Since the display of the search results is animated and requires no user input, the full-screen mode can be implemented without displaying control objects on the display.

C. Flow Processes for Embodiments of the Invention

Figure 2:
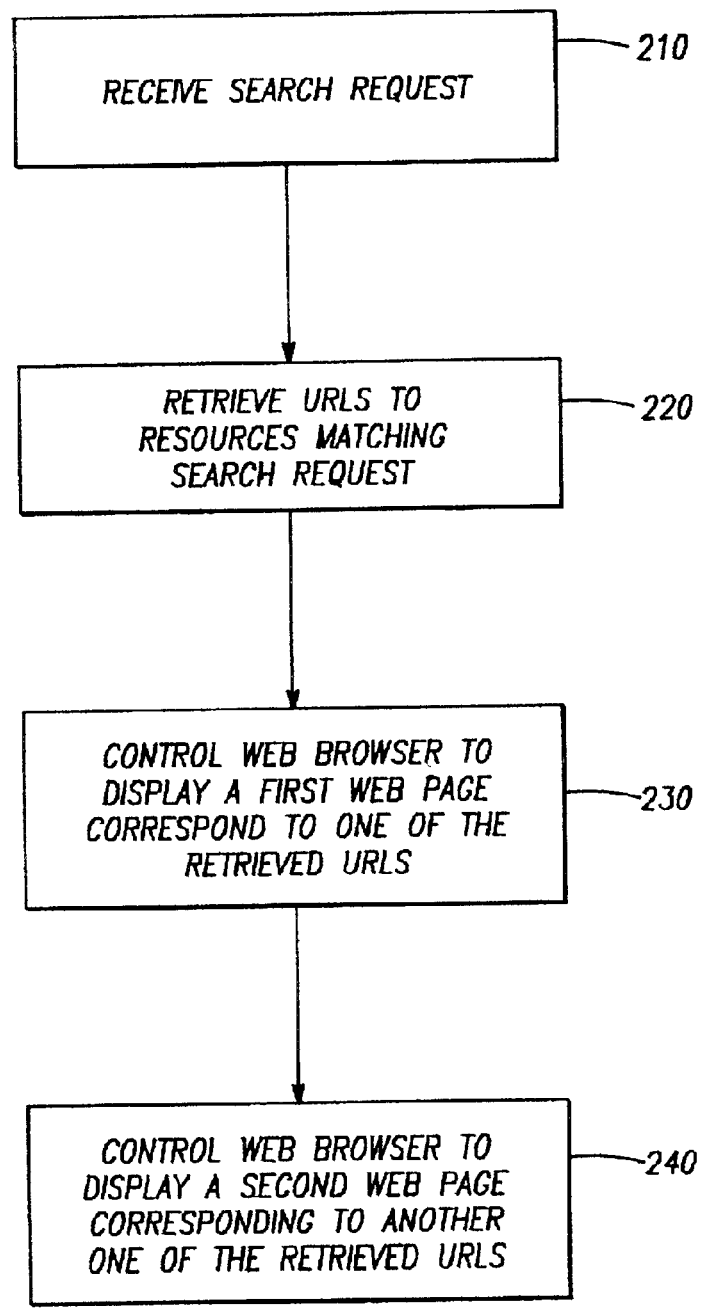
FIG. 2 illustrates a method to display network sites in response to a search request, under an embodiment of the invention.

FIG. 2 illustrates a flow process for a system such as described with FIG. 1, operating on a network such as the Internet. For discussion, network browser 110 is assumed to be a web browser, and components and features described with FIG. 1 are assumed to be adapted for the Internet.

In step 210, search module 120 receives the search request from user terminal 10. In response to receiving the search request, in step 220, the search module 120 retrieves URLs to web resources that match the search request.

In step 220, search module 120 may access a web search engine. The web search engine then identifies URLs to web pages that match the search criteria.

In step 230, search module 120 controls the web browser 110 of user terminal 10 to display a web page of a first URL retrieved in step 220. The first URL is signaled with control information to the API 112 of web browser 110.

In step 240, search module 120 controls the web browser 110 to display a web page of a second URL retrieved in step 120. The web browser 110 may be controlled so as to display a web page of the second URL after the web page of the first URL is displayed.

In an embodiment, web pages of additional URLs contained in the search result may be displayed in a manner similar to web pages of the first and second retrieved URLs. Thus, the search result may be provided as multiple web pages that are displayed on, for example, a monitor of user terminal 210. The web browser may be controlled by search module 120 to display the web pages in the search result in an animated manner.

Once all the web pages of URLs in the search result are displayed, the process in FIG. 2 may be repeated. Thus, the web pages may be redisplayed. This process may continue until the user signals otherwise. When the web pages are re-displayed, the web browser 110 has already cached the corresponding URLs. Thus, the display of the web pages may occur more quickly, or in a more continuous and animated fashion.

Figure 3:
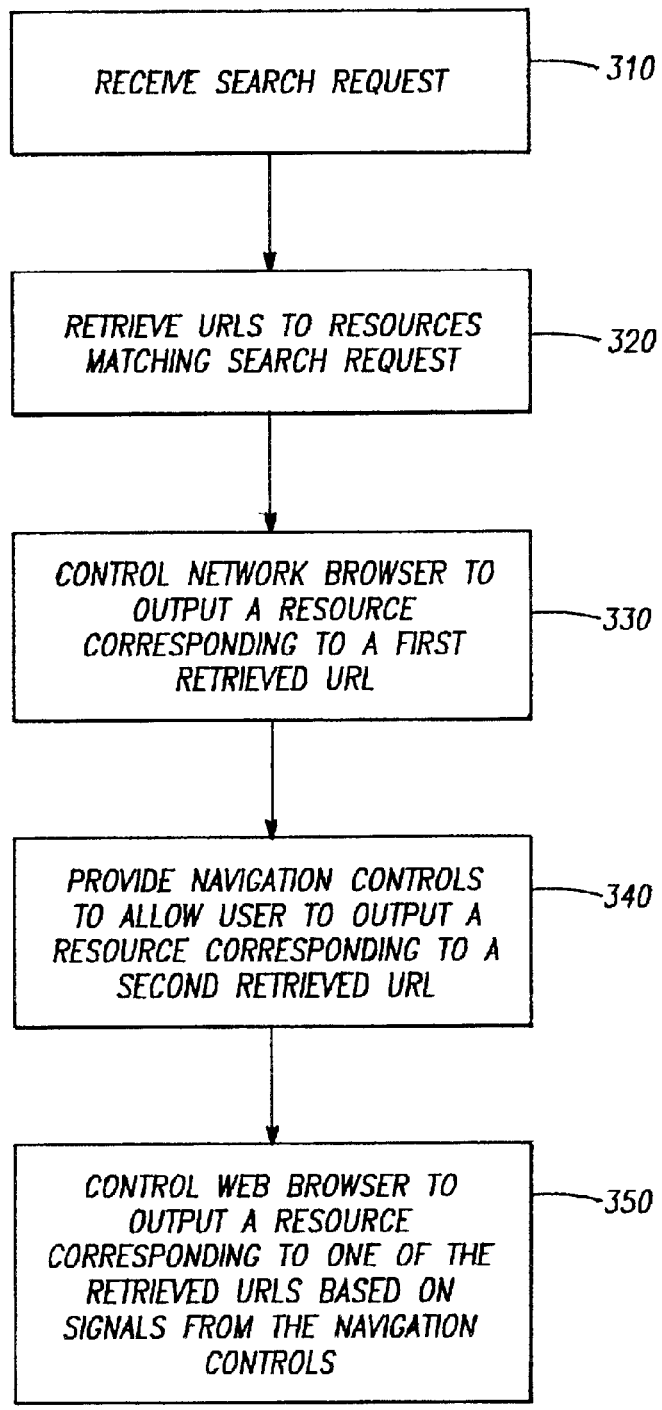
FIG. 3 illustrates a method to display web pages in response to a search request, under an embodiment of the invention.

FIG. 3 is a flow process for another embodiment of the invention, employed with a network browser for networks including Internet, wide-area networks such as America Online™, and Intranets.

In step 310, a search request is received by search module 120. Then in step 320, search module 120 retrieves URLs to network resources that match the search request. Each URL accesses a corresponding network resource. The network resources comprise data that forms an output on the user terminal 10, once the network resources are accessed by the network browser 110.

In step 330, the search module controls the network browser 110 to output a resource corresponding to a first one of the retrieved URLs. The resource outputted may correspond to, for example, a web page.

In step 340, a navigation control is provided to a user on the user terminal 10. The user can select to output a resource corresponding to a second one of the retrieved URLs using the navigation control. An example of a navigation control is provided with FIG. 8. The navigation control may be provided by search user-interface module 115. The navigation control may include a user-interactive feature that signals search module 120 to access a next URL from the retrieved URLs. The navigation control may also provide user-interactive features to replay a resource from one of the URLs, or to skip to a specific URL. The navigation control may also "pause" the output on user terminal 10 of a network resources corresponding to one of the retrieved URLs. Other navigation controls are described with FIG. 8.

In step 350, network browser 110 is controlled to output a resource corresponding to one the retrieved URLs, based on a control signal received by the navigation controls. For example, a "next" signal may be provided through input to the navigation control, causing a network resource corresponding to a second retrieved URL to be outputted on the user terminal 10.

Additional network resources of other URLs contained in the search result may be provided by repeating steps 340 and 350. Once all URLs in the search response are outputted via network browser 110, the process may end. In an embodiment, the search module 120 may be configured to repeat signaling each URL in the search result to network browser 110 once all URLs in the search request are signaled. Thus, the process may be continuously repeated until the user signals to stop the output of the network resources.

In an embodiment, the order in which the network sites are displayed to the user are random. In another embodiment, the order in which the network sites are displayed to the user correspond to the order of matching each site is designated by the network search engine 130.

Figure 4:
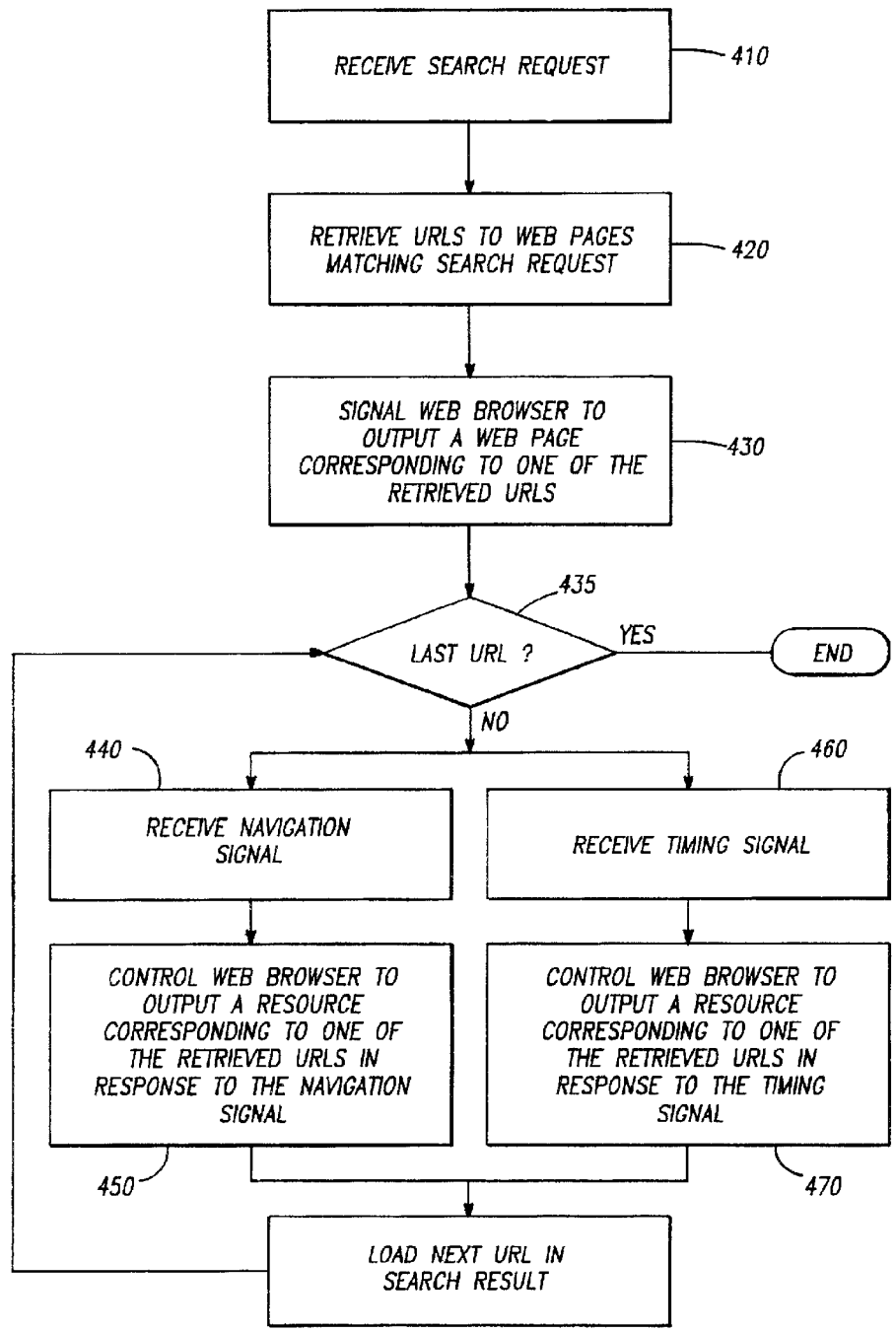
FIG. 4 illustrates another method to display network sites in response to a search request, under an embodiment of the invention.

FIG. 4 illustrates a flow process under another embodiment of the invention. For illustration, the embodiment of FIG. 4 is assumed to operate with a terminal coupled to the Internet.

In this embodiment, the search request is received in step 410. In response, step 420 provides that a plurality if URLs are retrieved that have web pages determined to match the search criteria. In step 430, the web browser on user terminal 10 is signaled to output a web page corresponding to one of the URLs. The web page may be a site that contains one or more web resources matching the search criteria.

In step 435, a determination is made as to whether any other URLs exist among the retrieved URLs. If the determination is negative, the process is done.

In step 440, a navigation signal may be received through a navigation control interface. Then, in step 450, the web browser is controlled to output a web page corresponding to one of the retrieved URLs. This is done is response to the navigation signal being received in step 440.

In step 460, a timing signal may be actuated to retrieve a web page of a second URL from the retrieved URLs. For example, search module 120 may be programmed to provide the timing signal after one second. The timing signal may be configurable by the user on user terminal 10, using an interface such as described with FIG. 8. For example, the user may select the frequency at which each web page is displayed in response to a search request. In step 470, upon receiving the timing signal, the web browser on user terminal 10 is controlled to output a web page corresponding to another one of the retrieved URLs.

In step 480, a next URL among the retrieved URLs is loaded into web browser 110. The process returns to step 435.

In an embodiment, steps 460 and 470 are a default in case a navigation signal is not received. That is, unless the user on user terminal 10 instructs otherwise, the search module 120 will use a timing signal to determine when the next web page corresponding to a next URL in the retrieved URLs is displayed.

D. Embodiment Including Verification and Caching

Figure 5:
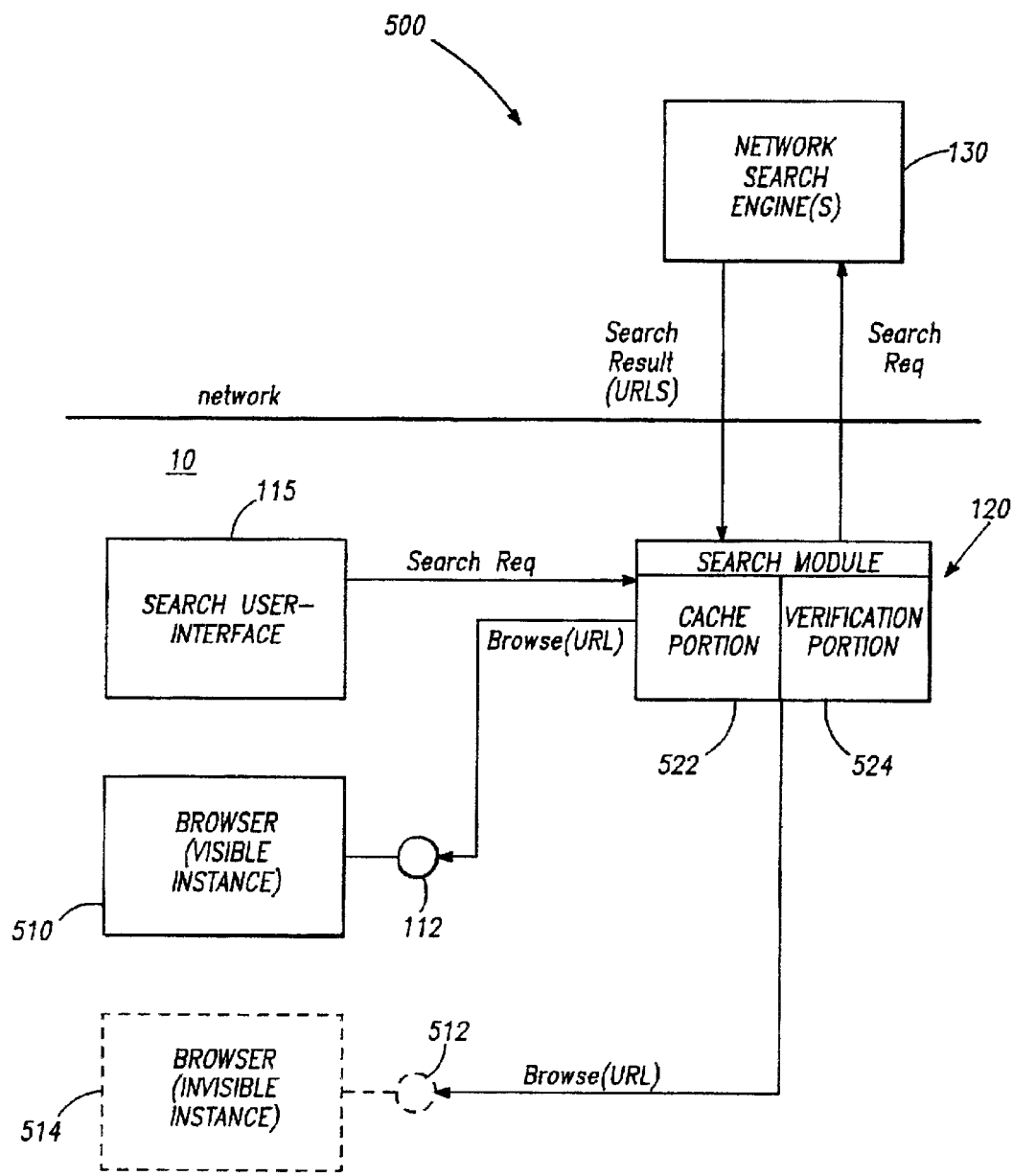
FIG. 5 is a system including verification and caching of URLs in a response to a search request, under an embodiment of the invention.

FIG. 5 illustrates an embodiment in which a system 500 includes verification and caching functions. In this embodiment, web browser 110 includes a visible instance 510 and an invisible instance 514.

As with previous embodiments, a user enters a search request through search user-interface module 115. The search user-interface module 115 signals the search request to search module 120. The search module 120 forwards the search request to one or more search engines residing on the network. A search result comprising one or more URLs is provided from each of the network search engines used. The search module 120 then signals API 112 of visible instance 510 a command to browse each of the URLs in the search request. The search module signals the API 512 of the invisible instance 514 a command to browse the URLs in the search request as well. The relative sequence in how the visible instance 510 and the invisible instance 514 are signaled the URL are described in greater detail with FIG. 7.

The invisible instance 514 may be employed by search module 120 for purpose of verifying links and/or caching URLs returned in the search results. The search module 120 may communicate with the invisible instance 514 through a corresponding API 512.

A caching portion 522 of search module 120 caches the network resource of the URLs in the search request prior to the web browser displaying the network resources of the URLs. Under an embodiment of the invention, when the search results are returned by the network search engine 130, the visible instance 510 of web browser 110 loads a current URL from the search result. The visible instance 510 of web browser 110 then displays resources on the site of the URL using search user-interface module 115. Concurrently, the invisible instance 514 loads a next URL retrieved in the search request, so that the resource of the next URL, or next URLs, in the search result is cached before the network resource of the next URL is displayed.

A verification portion 524 of the search module 120 verifies that network resource identified by the next URL returned with the search result can be loaded to display or otherwise output network resources on the user terminal 110. When network resources of a current URL are loaded in the visible instance 510, the verification portion 524 loads the network resources of the next URL in the invisible instance 514. If network resources are returned for the next URL signaled to the invisible instance 514, the next URL is verified by the verification portion 524. In an embodiment, the next URL is verified if the network resource of the next URL is available and unbroken. Only the network resources of verified URLs are loaded by the visible instance 510.

The verification portion 524 and caching portion 522 occur independently of the network resources loaded in the visible instance 510. Thus, the caching portion 522 and verification portion 524 may cache and verify network resources of additional URLs while the visible instance 510 has loaded network resources of a previous URL.

In an embodiment such as shown by FIG. 4, the web browser 110 and search module 120 reside on the user terminal 10. However, in other embodiments, portions of the search module 120, such as the verification portion 524 reside on a server accessible to user terminal 10 through a network such as the Internet.

Figure 6:
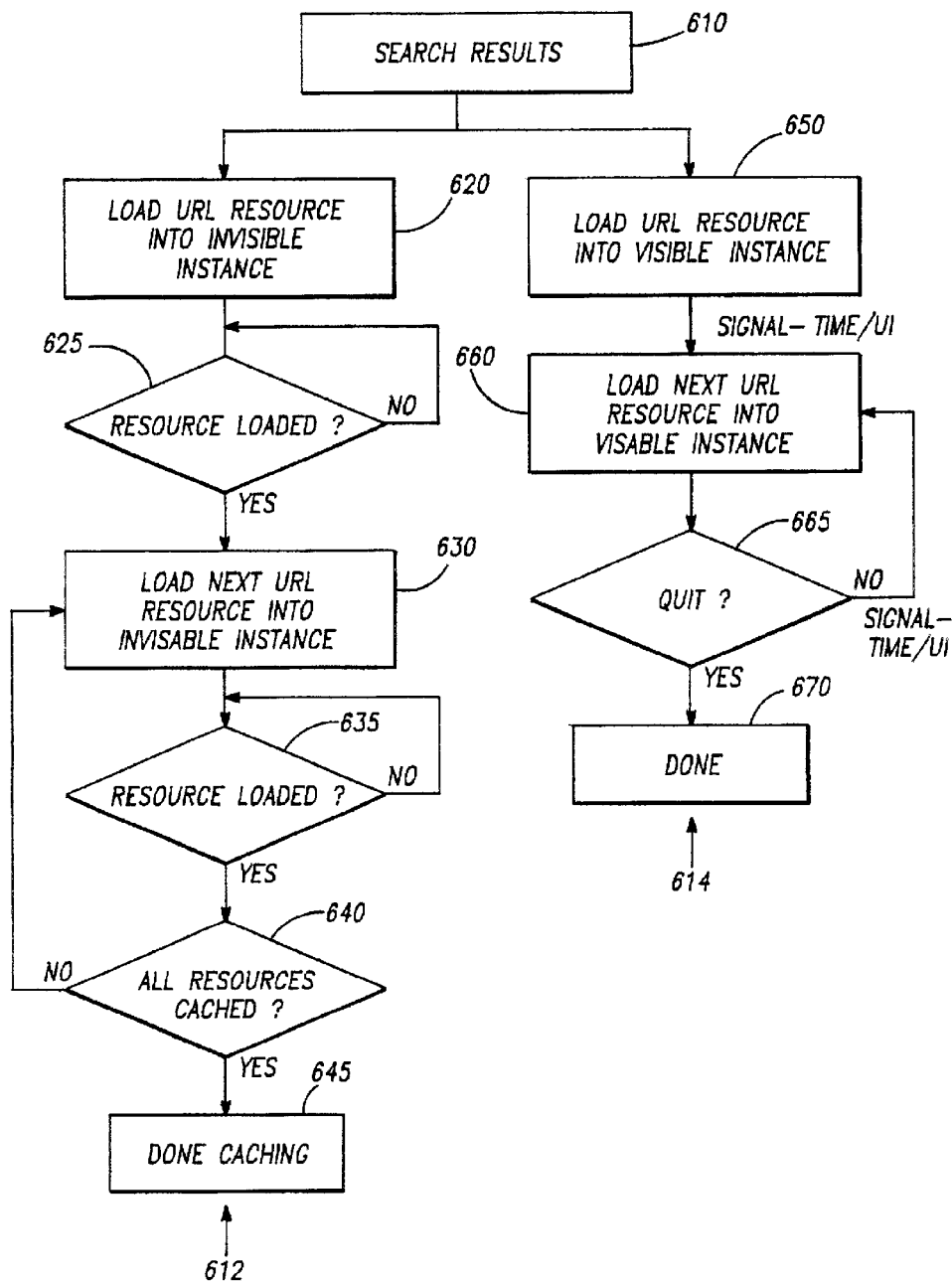
FIG. 6 illustrates a method for a system such as shown in FIG. 5, where caching and displaying the search result are performed as independent processes, under an embodiment of the invention.

FIG. 6 illustrates another embodiment where caching and displaying URL resources identified by the search result occurs concurrently and independently of each other. This process may be employed with a system such as described with FIG. 5. The system attempts to cache the web pages identified by the search request while web pages are individually being displayed on the end terminal. Thus, the system may attempt to cache all the web pages located in the search while concurrently displaying web pages located by the search.

In step 610, the search result is returned from the network search engine 130. For purpose of description, the search result is assumed to contain a plurality of URLs. Once the search result is returned, the user terminal 10 concurrently performs a caching process 612 and a display process 614. For this embodiment, the caching and display process are performed independent of each other.

In the caching process 612, step 620 is performed to load a URL resource into an invisible instance 514 of the web browser. In step 625, a determination is made as to whether the URL resource was loaded. If the determination is negative, then step 620 is performed again. In step 630, the next URL resource in the search result is loaded into the invisible instance 514 of the web browser. In step 635, a determination is made as to whether the next URL resource was loaded. If the determination is negative, step 630 is repeated.

If the next URL resource was loaded, then in step 640 a determination is made as to whether all URL resources in the search result have been cached. If all resources have been cached, then the caching process is done in step 645. If additional caching is required, then step 630 is repeated.

In an alternative embodiment, caching may be terminated prior to all of the URL resources in the search result being displayed. This may occur if all of the search results are displayed, or if the display process 614 is stopped.

The display process 614 is performed independently of the caching process. In step 650, a URL resource from the search result is loaded into the visible instance 510 of the web browser. In step 660, the next URL resource identified by the search result is loaded into the visible instance 510. The next URL resource may be loaded upon the visible instance 510 being signaled to load the next URL resource. The signal to the visible instance 510 may be a timing signal. Alternatively, user input may cause the next URL resource to be loaded.

In step 665, a determination is made as to whether the display process is completed. If the determination is positive, then the display process 614 is complete in step 670. Otherwise, step 660 is repeated. The display process 614 may be complete if, for example, the display process 614 is timed out. Alternatively, the display process 614 may be complete if user input stops the display process 614. For example, the user may select an icon on the user-interface 800 (See FIG. 8) to stop an animated slide show displaying the URL resources identified by the search result.

In an embodiment, the caching process 612 is terminated once the display process 614 is complete. Also, in an embodiment, the display process 614 may continue after the caching process 612 is complete.

Figure 7:
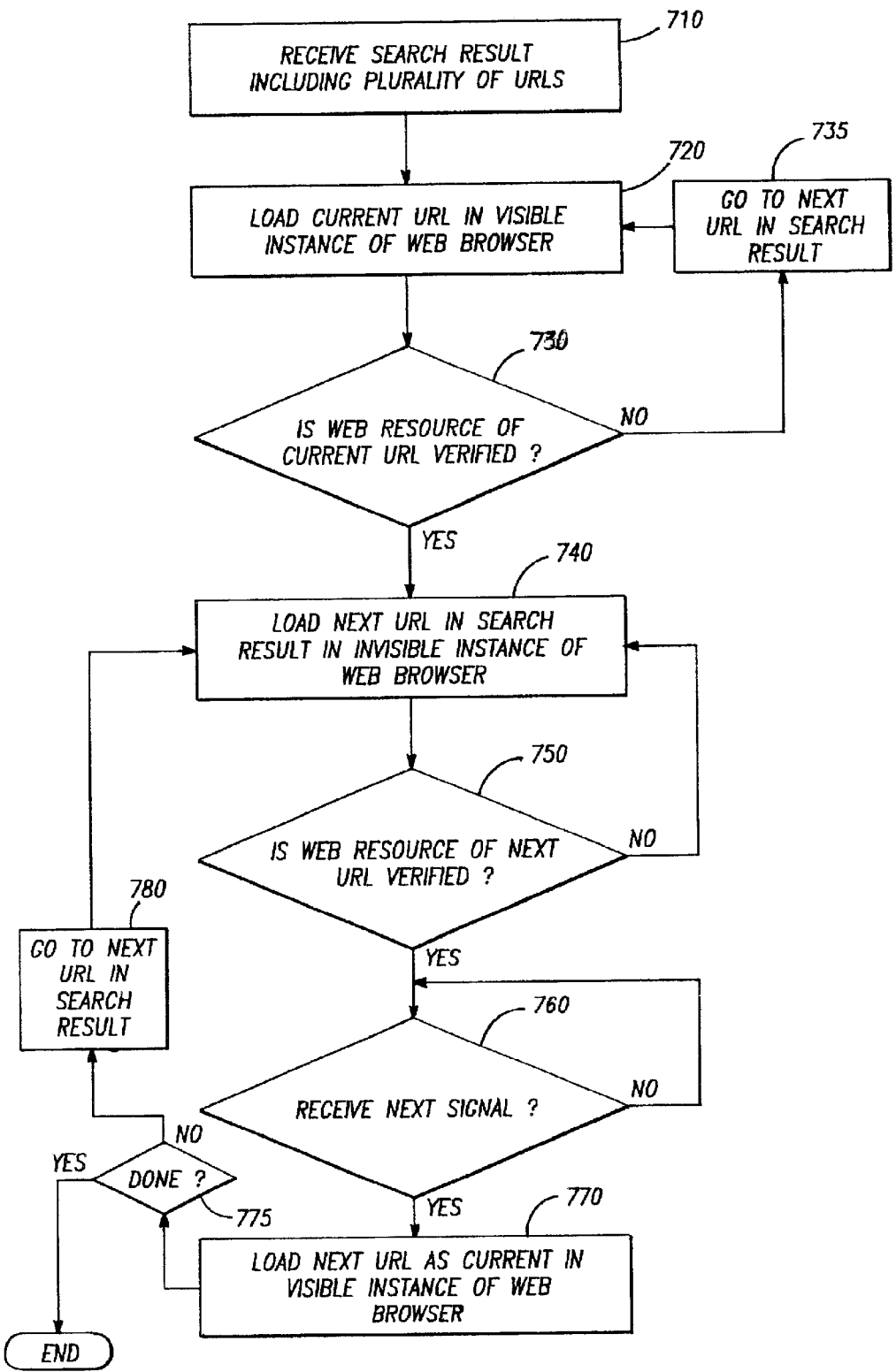
FIG. 7 illustrates a method for a system such as shown with FIG. 5, under an embodiment of the invention.

FIG. 7 illustrates a flow process for use with system 500, under an embodiment of the invention. The system 500 is assumed in this embodiment to operate on a network such as the Internet.

In step 710, the search result is returned from the network search engine 130. For purpose of description, the search result is assumed to contain a plurality of URLs. In step 720, a current URL is loaded into the visible instance 510 of web browser 110. In this step, the current URL corresponds to a first URL in the search request.

In step 730, a determination is made as to whether the current URL is verified. To be verified, a web resource has to be returned when the current URL is loaded into the web browser. For example, a web page of the URL has to be displayed on user terminal 10. The determination in step 730 may be negative if the URL is a broken link. The link may be broken if, for example, the web resource is no longer available. The URL may also be broken for other reasons, such as network congestion or failure by a hosting server of the URL. The determination in step 730 may also be negative if the web site of the URL is unavailable, such as in the case when there is traffic blocking access to the Internet. If the determination is step 730 is negative, a next URL in the search result is assumed to be the current URL in step 735. Then, step 720 is repeated.

If the determination is step 730 is positive, the current URL is loaded to be verified by the visible instance 510, and the web page (or web resource) of the URL is displayed to the user of user terminal 10. The search user-interface module 115 may be used to display the web page. Concurrently in step 740, the next URL in the search result is loaded into the invisible instance 514 of web browser 110.

In step 750, a determination is made as to whether the next URL is verified. The determination is made by the invisible instance 414 of web browser 110. If determination is negative, in step 740 is repeated for a next URL. If the determination in step 750 is positive, then the invisible instance 514 has received a web page (or web resource) from the next URL. Thus, the next URL is not a broken link, and has an available web page.

In step 760, a determination is made as to whether a signal has been received to load a next URL in the visible instance 510 and invisible instance 514 of web browser 110. In an embodiment, the signal is a timing signal from the search module 120. For example, after a predetermined number of seconds, the timing signal may signal to load the next URL after a few seconds. In other embodiments, the signal is provided by a user of user terminal 10. The user signal may be provided through a navigation control 730, such as described with FIG. 8.

If the determination in step 760 is positive, in step 770 the next URL previously loaded in the invisible instance 514 is loaded in the visible instance 510. In step 775, a determination is made as to whether the URL loaded in the visible instance 510 is the last URL in the search result. If so, then the process is done.

If there is another URL in the search result, the system 500 goes to the next URL in step 780. The flow process is repeated for the next URL in step 740.

E. User-Interface

Figure 8:
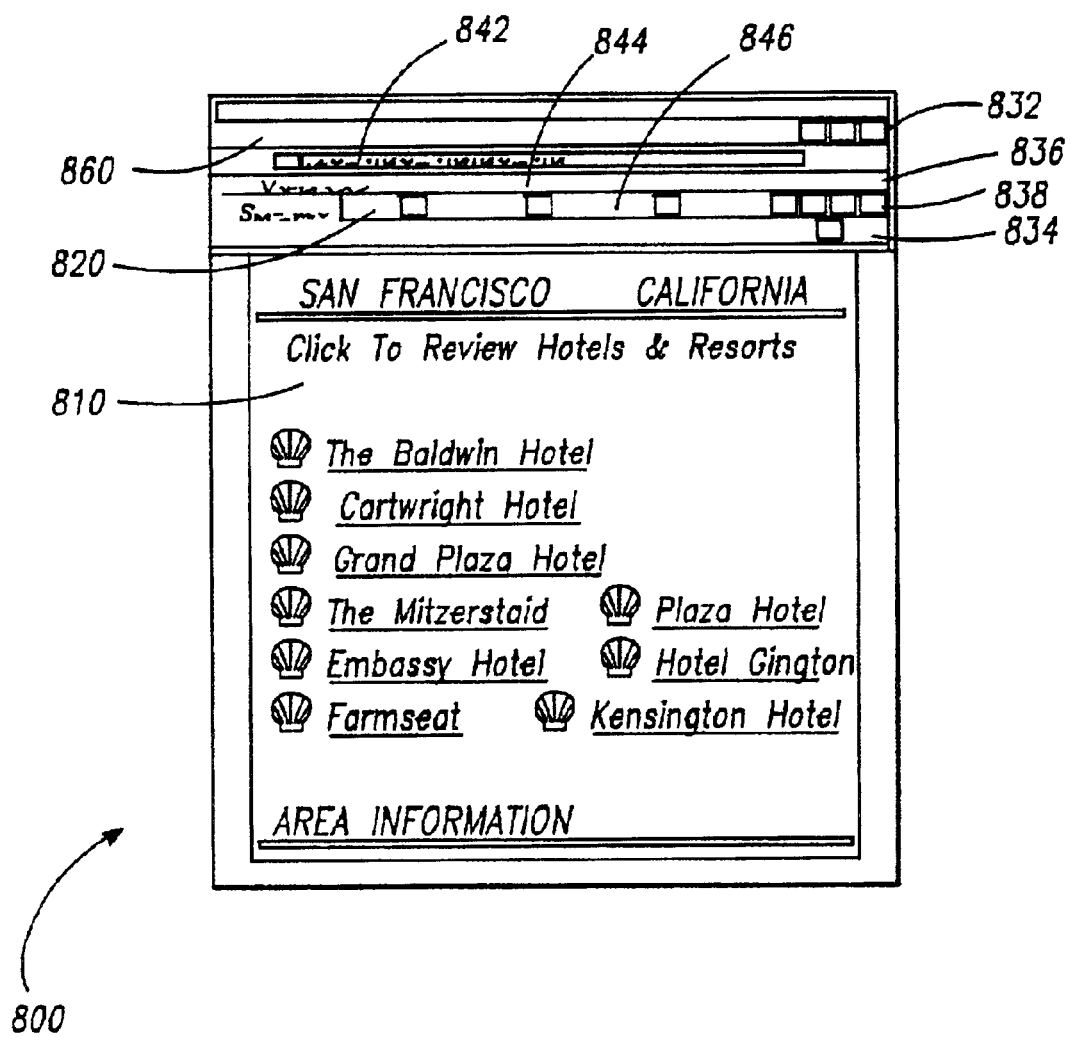
FIG. 8 illustrates a user-interface, under an embodiment of the invention.

FIG. 8 illustrates a user-interface 800 for user terminal 10, under an embodiment of the invention. For purpose of description, user-interface 800 is described with respect to Internet applications. The user-interface 800 may occupy a portion of a screen or monitor of user terminal 10. A portion of the screen or monitor may be dedicated to displaying network resources of retrieved URLs.

In an embodiment, the user-interface 800 cooperates with web browser 110 on user terminal 10. The user-interface 800 includes a display portion 810 that displays web pages of retrieved URLs. A search field 820 receives a search request as text entry. For example, key words such as "San Francisco" may be entered into the search field 820. Once the search request is entered, the system 100 returns URLs that match the search request to the web browser of user terminal 10. Then the web browser sequentially accesses the web sites corresponding to the URLs. The web browser displays a web page for each site before accessing the next site. The web page for each site is displayed in display portion 810 of user-interface 800.

The user-interface 800 includes a navigation control 830 to allow a user to navigate the display of web pages. In an embodiment, the web browser 110 is programmatically controlled to display web pages sequentially, in an animated fashion. For example, web pages to all of the web sites returned in the search may be displayed in the manner of a slide show, where one web page is displayed, then a next, until of the web pages in the search are shown. In an embodiment, a next web page may be displayed a predetermined time duration after a previous web page is displayed on the display portion 810.

In an embodiment, the navigation control 830 is configured to provide controls for a slide show. The navigation control may include a stop icon 832 that stops the that stops the slide show at a selected web page. The navigation control 830 may include a pause icon 834 that can be actuated to pause the slide show at the selected web page. Re-actuation of the pause icon 834 causes the slide show to continue from the selected web page. The navigation control 830 may also include a play icon 836 to cause the web browser to start displaying web pages in the manner of a slide show. A skip icon 838 causes the web browser to load a next URL retrieved in the search, and to display the web page for the next side. The skip icon 838 may be used to create the effect that a next slide was selected in the slide show. As mentioned in the embodiment of FIG. 4, a timing signal may serve as the default in causing the next web page to appear, unless the skip icon 838 is selected by the user. Alternative embodiments may use and arrange icons as manual controls, such as found on remote controls or VCRs.

The user-interface 800 may also include a web browser portion 860. The web browser portion 860 may be used to display the URLs of the web pages being displayed or loaded by the web browser component. Various web browser features may be provided with the web browser portion.

The user-interface 800 may also include a plurality of configuration fields. The configuration fields may be in the form of pull-down menus. A search selection menu 842 enables the user to select the search engine that matches the user's preference. For example, the user may configure the user-interface 800 to display specific search engines according to the user's preferences. A search type menu 844 enables the user to select the data type of the web resources for the search. For example, the user may select audio data type for music, or MPEG data types for specific type of music. A configuration menu 846 enables a user to configure the manner in which the web pages for the retrieved URLs is displayed. For example, the configuration menu may provide for a selectable item that configures the timing signal, so that the web pages are displayed faster or slow to the user.

F. Applications for Embodiments of the Invention

Embodiments of the invention may be implemented in applications such as described below.

In one application, an e-commerce site containing an internal search engine is contacted by user terminal 10. The search module 120 receives the search request specific for the e-commerce site, and then signals the search request to the internal search engine of the e-commerce site. For example, the search request may be for a specific product or service, such as books, music, and travel packages. The search result is then signaled to search module 120, which outputs web pages for each search result. Thus, a user may visually see prices and purchasing information for a product or service in response to a search request.

As an example, a user may enter an author name. The search module 120 signals the internal search engine of the e-commerce site. The search result contains URLs to books by that author. The URLs are then sequentially and automatically displayed to the user. Thus, the user can see the various books, along with purchasing information such as pricing and availability, in rapid succession, without having to select and reselect links to navigate between different products.

As another example, the e-commerce site may be an auction site. The internal search engine of the auction site may return various auctions that match the search criteria. The user is able to see each auction sequentially, without having to select and reselect links to each auction individually.

Travel packages may be displayed to the user in a similar manner. Thus, users may submit a search request to rapidly see pictures of resorts, along with pricing information and availability.

As another application, a message board may include an internal search engine. The search request may specify content of messages. Each message matching the search request may be automatically and sequentially displayed to the user. Further, the user may configure the system to display messages for a certain duration, affording the user to read or skim each message. The navigation controls of search user-interface may be used to add further controls to the user. Another application may display message board threads to the user sequentially and in rapid succession.

G. Other Features and Alternative Embodiments

In other embodiments, the network resources corresponding to the first one and/or the second one of the retrieved URLs may be an audio output, or a combination of an audio output and a video output. The audio or video output may be in addition or combination with other embodiments described above in which the resources are displayed items on the network.

In another embodiment, the user-interface 700 includes a record user-interactive feature. The record feature may be selected to create a list of network sites that are of particular interest to the user. For example, a record icon may be selected once a web page is displayed, causing the URL web page to be stored in a favorite list. The favorite list may subsequently be selected to display all or some of the web pages therein. In an embodiment, the recorded list may be selected so that the network resources of the recorded URLs are replayed as a slide-show, or otherwise in an animated fashion.

In a variation, the user may select to add a URL of a web page being displayed to a bookmark of the web browser.

In another embodiment, the system 100 provides an audible sound for each network site displayed.

H. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A method for conducting searches over a network, the method comprising:

providing a search request to a search engine;

receiving a search result that identifies a plurality of links, and wherein at least some of the links are each associated with an information resource and a network address, and wherein one or more of the plurality of links are individually received with control information;

displaying a first information resource that that is associated with a first link in the search result; and automatically displaying at least a subsequent information resource that is associated with a second link in the search result;

and wherein the step of automatically displaying at least the subsequent information resource includes (i) using control information provided with the second link, and (ii) displaying the subsequent information resource without displaying the first information resource.

2. The method of claim 1, further comprising automatically displaying a plurality of subsequent information resources in a sequence, wherein each of the plurality of subsequent information resource is associated with one of the links in the plurality of links identified by the search result.

3. The method of claim 2, wherein displaying a plurality of subsequent information resources in a sequence includes displaying each of the plurality of subsequent information resources for a predetermined duration before automatically displaying a next information resource in the plurality of subsequent information resources.

4. The method of claim 1, further comprising automatically displaying a plurality of subsequent information resources in a sequence, wherein each subsequent information resource has a corresponding link in the plurality of links identified by the search result, and wherein each subsequent information resource that is displayed replaces a previously displayed information resource.

5. The method of claim 1, wherein the search engine is internal to a network site.

6. The method of claim 1, wherein the step of providing a search request includes providing one or more criteria relating to a product or service to an internal search engine of an e-commerce site.

7. The method of claim 6, wherein each of at least some of the links identified by the search result correspond to an information resource that provides information about purchasing the product or service.

8. The method of claim 7, wherein the information includes price information.

9. The method of claim 7, wherein the information relates to availability of the product or service.

10. The method of claim 9, wherein the e-commerce site corresponds to a site on which travel products or services are advertised.

11. The method of claim 10, wherein the e-commerce mite corresponds to a site on which travel products or services are offered for sale.

12. The method of claim 11, wherein:
the step of providing a search request to a search engine includes specifying a criterion relating to a travel product or service based on a user-input;
the step of receiving a search result that identifies a plurality of links includes receiving one or more links to associated with pages on which information about travel products or services that match the criterion are provided;
the step of displaying a first information resource includes displaying a first page on which information relating to the travel product or service is provided; and
the step of automatically displaying at least a subsequent information resource includes displaying a second page on which information relating to the travel product or service is provided.

13. The method of claim 11, wherein the steps of displaying the first information resource and automatically displaying the subsequent information resource include displaying a first image of a travel product or service, then displaying a second image of a travel product or service, wherein the first image and the second image are provided by the first information resource and the subsequent information resource respectively.

14. The method of claim 6, wherein the steps of displaying a first information resource and automatically displaying at least a subsequent information resource include displaying a first image relating to the product or service, then displaying a second image relating to the product or service, wherein the first image and the second image are provided by the first information resource and the subsequent information resource respectively.

15. The method of claim 14, wherein receiving a search result includes receiving a plurality of links, including one or more links that correspond to an information resource that offers information relating to purchasing one or more products or services that match the search criteria.

16. The method of claim 15, wherein the first information resource and the subsequent information resource each provide information relating to purchasing the one or more products or services that match the search criteria.

17. The method of claim 16, wherein the information relating to purchasing the one or more products or services includes information relating to a price and availability of a specific product or service.

18. The method of claim 6, wherein the step of providing one or more criteria relating to a product or service includes providing one or more criteria that identifies one or more products, wherein the one or more products includes one or more books.

19. The method of claim 18, wherein the one or more criteria corresponds to an author.

20. The method of claim 19, wherein the step of receiving a search result includes receiving at least one link in the plurality of links that corresponds to an information resource having information about pricing and availability of a particular book.

21. The method of claim 20, wherein the first information resource and the subsequent information resource each provide information about pricing and availability of the particular book.

22. The method of claim 6, wherein the e-commerce site corresponds to an online auction site.

23. The method of claim 22, wherein:
the step of providing a search request to a search engine includes specifying one or more criteria for identifying an auction based on a user-input;
wherein the step of receiving a search result that identifies a plurality of links includes receiving links to auctions that match the criteria;
wherein the step of displaying a first information resource includes displaying information about a first auction that matches the criteria; and
wherein the step of automatically displaying at least a subsequent information resource includes displaying information about a second auction that matches the criteria.

24. The method of claim 1, wherein the step of receiving a search result that identifies a plurality of links includes receiving a plurality of uniform resource locators, wherein each uniform resource locator corresponds to a page provided at a network site.

25. The method of claim 1, wherein the step of providing a search request includes specifying a criteria for selecting music.

26. The method of claim 1, wherein at least the first information resource and the subsequent information resource in the search result are each associated with a corresponding music file.

27. The method of claim 26, further comprising the step of playing the music file associated with the at least one of the first information resource and the subsequent information resource concurrently while performing at least one of the steps of displaying the first information resource and displaying the subsequent information resource.

28. The method of claim 1, wherein the first information resource and the subsequent information resource each include a page provided on a network site.

29. The method of claim 1, wherein at least one of the first information resource and the subsequent information resource include data of a type selected from a group consisting of text, image, or media.

30. The method of claim 1, wherein at least one of the first information resource and the subsequent information resource are for enabling a user to purchase music.

31. The method of claim 1, wherein the step of automatically displaying at least the subsequent information resource includes replacing a rendering of the first information resource with a rendering of the second information resource.

32. The method of claim 1, wherein at least some of the resources associated with the plurality of links in the search result are still images.

33. A method for conducting searches on a user terminal connected to the Internet, the method comprising:
a search request to at least one network search engine;
receiving a search based at least in part on the search request that identifies a plurality of links that each correspond, at least in part, to a uniform resource locator, wherein each uniform resource locator identifies a network resource located on the Internet;

for a first link in the search result, signaling a browser component to display a first network resource on the user terminal; wherein the signaling includes using at least part of a first uniform resource locator that identifies the first network resource and control information that causes the browser component to access the first network resource;

for a second link in the search result, signaling a browser component to display a second network resource on the user terminal; wherein the signaling includes using at least part of a second uniform resource locator that identifies the second network resource and control information that causes the browser component to access the second network resource;

wherein signaling the browser component further includes using at least some of the control information signaling with at least one of the first link and second link to cause the second network resource to replace the first network resource being displayed on the user terminal.

34. The method of claim 33, wherein the browser component is a web browser.

35. The method of claim 33, wherein signaling the browser component to display the first network resource and to display the second network resource includes signaling the browser component to display a first still image corresponding to the first network resource and a second still image corresponding to the second network resource.

36. The method of claim 35, wherein using at least some of the control information signaled with at least one of the first link and second link includes using that control information to cause the second network resource to be displayed sequentially and automatically after the first network resource is displayed.

37. The method of claim 36, wherein the first network resource and the second network resource are each still images.

38. The method of claim 33, wherein the step of providing a search request includes providing one or more criteria relating to a product or service to an internal search engine of an e-commerce site.

39. The method of claim 38, wherein each of at least some of the links identified by the search result correspond to a network resource that provides information about purchasing the product or service.

40. The method of claim 39, wherein the information includes price information.

41. The method of claim 39, wherein the information relates to availability of the product or service.

42. The method of claim 33, wherein the step of providing a search request includes specifying a criteria for selecting music.

43. The method of claim 33, wherein at least the first network resource and the second network resource in the search result are each associated with a corresponding music file.

44. The method of claim 43, further comprising the step of playing the music file associated with the at least one of the first network resource and the second network resource concurrently while performing at least one of the steps of displaying the first network resource and displaying the second network resource.

* * * * *

UNITED STATES PATENT AND TRADEMARK OFFICE
CERTIFICATE OF CORRECTION

| | | |
|---|---|---|
| PATENT NO. | : 7,010,537 B2 | Page 1 of 1 |
| APPLICATION NO. | : 09/843286 | |
| DATED | : March 7, 2006 | |
| INVENTOR(S) | : Aviv Eyal et al. | |

It is certified that error appears in the above-identified patent and that said Letters Patent is hereby corrected as shown below:

In the Claims:

Claim 1: Column 10, line 35, delete "that that" and insert --that--.

Claim 2: Column 10, line 48, delete "resource" and insert --resources--.

Claim 11: Column 11, line 14, delete "mite" and insert --site--.

Claim 12: Column 11, line 23, delete "to associated with" and insert --associated with--.

Claim 33: Column 12, line 64, delete "a search request" and insert --providing a search request--;
Column 12, line 65, delete "a search based" and insert --a search result based--;
Column 13, line 20, delete "signaling with" and insert --signaled with--.

Signed and Sealed this

Twenty-fifth Day of July, 2006

JON W. DUDAS
*Director of the United States Patent and Trademark Office*